(12) United States Patent
Legge et al.

(10) Patent No.: US 11,292,282 B1
(45) Date of Patent: Apr. 5, 2022

(54) DIGITAL PAYMENT CARD WITH HIDDEN FEATURES

(71) Applicant: Nu Pagamentos S.A., São Paulo-SP (BR)

(72) Inventors: Amanda Harrington Legge, São Paulo-SP (BR); Maria Eduarda Di Pietro Augusto Costa, São Paulo-SP (BR); Ariane Maria Morganti, São Paulo-SP (BR); Thais Teixeira Burin, São Paulo-SP (BR); Cristina Helena Zingaretti Junqueira, São Paulo-SP (BR); Lucas Visvikis Pettinati, São Paulo-SP (BR)

(73) Assignee: Nu Pagamentos S.A., São Paulo-SP (BR)

( * ) Notice: Subject to any disclaimer, the term of this patent is extended or adjusted under 35 U.S.C. 154(b) by 0 days.

(21) Appl. No.: 17/533,688

(22) Filed: Nov. 23, 2021

Related U.S. Application Data

(63) Continuation of application No. 17/315,826, filed on May 10, 2021, now Pat. No. 11,230,136.

(51) Int. Cl.
*B42D 25/30* (2014.01)
*F21V 23/04* (2006.01)
*G06K 19/077* (2006.01)

(52) U.S. Cl.
CPC .......... *B42D 25/30* (2014.10); *F21V 23/0471* (2013.01); *G06K 19/077* (2013.01)

(58) Field of Classification Search
CPC ............................ B42D 25/30; F21V 23/0471
USPC ......................................................... 283/92
See application file for complete search history.

(56) References Cited

U.S. PATENT DOCUMENTS

| 5,277,307 | A  | 1/1994  | Kelly         |
| 7,028,012 | B2 | 4/2006  | St. Vrain     |
| 7,809,172 | B2 | 10/2010 | Lubow         |
| 7,975,927 | B1 | 7/2011  | Whitney       |
| 8,292,167 | B2 | 10/2012 | Behner et al. |

(Continued)

FOREIGN PATENT DOCUMENTS

| DE | 10344271 A1 | 4/2005  |
| EP | 1222620 B1  | 11/2005 |

(Continued)

OTHER PUBLICATIONS

International Search Report for PCT/US2021/031526, dated Sep. 28, 2021.

(Continued)

*Primary Examiner* — Allyson N Trail
(74) *Attorney, Agent, or Firm* — Nixon Peabody LLP

(57) ABSTRACT

A physical payment card includes hidden features (e.g., textual messages, graphics, emphasis features associated with conspicuous features of the payment card, or the like) undiscernible under only visible light, but discernable under ultraviolet light. A digital version of the physical card can be established on a user device. During setup, the user device can receive data regarding the hidden features that are associated with the physical card. Under a normal state, the user device can display the digital card without displaying the hidden features. However, upon activation (e.g., when the digital card is used, when the physical card is used, when the physical card is in sufficient proximity, or the like), the user device can display the hidden features on the digital card.

20 Claims, 16 Drawing Sheets

(56) References Cited

U.S. PATENT DOCUMENTS

| | | |
|---|---|---|
| 8,321,350 B2 | 11/2012 | Durst |
| 8,831,677 B2 | 9/2014 | Villa-real |
| 9,065,893 B2 | 6/2015 | Glaser |
| 9,579,921 B2 | 2/2017 | Kluge |
| 9,892,405 B2 | 2/2018 | Olson et al. |
| 9,934,503 B2 | 4/2018 | Elgar et al. |
| 9,965,756 B2 | 5/2018 | Davis et al. |
| 10,293,629 B2 | 5/2019 | Philippe et al. |
| 10,296,907 B1 | 5/2019 | Nolte et al. |
| 10,402,610 B2 | 9/2019 | Roach et al. |
| 10,510,070 B2 | 12/2019 | Wurmfeld et al. |
| 10,561,221 B2 | 2/2020 | Leitermann |
| 10,625,530 B2 | 4/2020 | Nelson |
| 2005/0060919 A1 | 3/2005 | Yu et al. |
| 2005/0167487 A1 | 8/2005 | Conlon et al. |
| 2006/0028820 A1 | 2/2006 | Fitzsimmons et al. |
| 2006/0196948 A1 | 9/2006 | Weber et al. |
| 2008/0030798 A1 | 2/2008 | O'Neil |
| 2012/0006995 A1 | 1/2012 | Greuel |
| 2012/0288135 A1 | 11/2012 | Jones |
| 2013/0303277 A1 | 11/2013 | Shigeta |
| 2014/0086567 A1 | 3/2014 | Feke |
| 2015/0227829 A1 | 8/2015 | Finn |
| 2016/0210621 A1 | 7/2016 | Khan |
| 2017/0053311 A1 | 2/2017 | Tiwary et al. |
| 2018/0231697 A1 | 8/2018 | Pires |
| 2018/0350180 A1 | 12/2018 | Onishuk |
| 2020/0184296 A1 | 6/2020 | Oliver |
| 2020/0218953 A1 | 7/2020 | Pohjola |

FOREIGN PATENT DOCUMENTS

| | | |
|---|---|---|
| EP | 1665140 B1 | 2/2016 |
| FR | 2840094 A1 | 11/2003 |
| WO | 2008083921 A1 | 7/2008 |
| WO | 2014207519 A1 | 12/2014 |

OTHER PUBLICATIONS

Written Opinion for PCT/US2021/031526, dated Sep. 28, 2021.

Multi-LED Card: Bring Dynamic Lights To Card Design (Jinco Universal, jinco.com.tw, Jan. 7, 2021.).

Bonthuys, Darryn, "Razer Made A Gamer Credit Card That Includes LED Lighting," gamespot.com, Oct. 6, 2020.

Nuñez, Mihcael, "This smart credit card has a cellphone antenna inside." mashable.com, Jan. 10, 2018.

Design a Durable, More Secure Credential (Bridgeway Solutions, bridgewayid.com, Aug. 11, 2020.).

Amazon 'White LED' Gift Box with Gift Card Claim Code (LED Gift Box, facebook.com, Feb. 22, 2018.).

Thomas, Anju Annie, et al., "Study of Security Features of Bank Cheques and Credit Cards and Decipherment," 2018 7th Int'l Conference on Reliability, Infocom Technologies and Optimization (ICRITO) (Trends and Future Directions), Aug. 29-31, 2018. DOI 10.1109/ICRITO.2018.8748316.

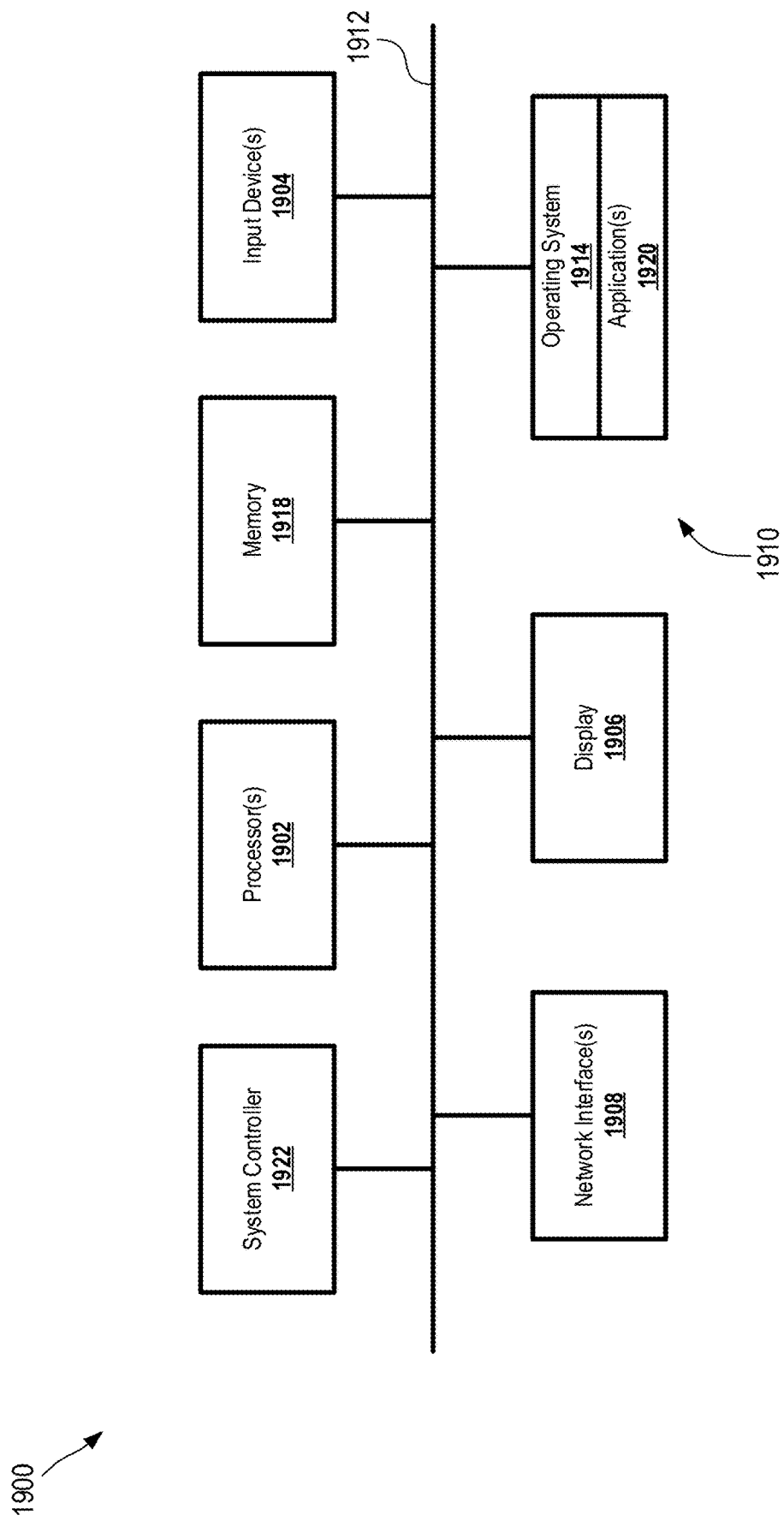

DIGITAL PAYMENT CARD WITH HIDDEN FEATURES

CROSS REFERENCE TO RELATED APPLICATIONS

The present application is a Continuation of U.S. patent application Ser. No. 17/315,826 filed May 10, 2021 and entitled "CONTAINER FOR PAYMENT CARDS WITH HIDDEN FEATURES," the disclosure of which is hereby incorporated by reference in its entirety.

TECHNICAL FIELD

The present disclosure relates to payment cards generally and more specifically to ultraviolet features of payment cards.

BACKGROUND

Payment cards are used in many settings for various purposes. Examples of payment cards include credit cards, debit cards, gift cards, loyalty cards, and the like. The quality and features of a given payment card can be of high importance to not only an end user, but also to the distributor of the card. For example, credit card distributors often compete to provide exclusive and impressive features on their cards, such as credit cards having a metal layer, credit cards with radiofrequency (RF)-enabled payment, and credit cards produced with colors indicating increasing tiers of exclusivity.

Additionally, unique or rare cosmetic features on a card can improve card sales, improve user engagement and enjoyment of the card, and increase the opportunity and urge for the user to show and/or recommend the card to others.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a container comprising a payment card receiving space for receiving a payment card having one or more ultraviolet-reactive features. The container can also include a power supply and one or more ultraviolet light sources. The container can include a container detector positioned to identify when the container is in an open configuration. The container detector causes the one or more ultraviolet light sources to illuminate in response to the container being in the open configuration. Thus, the container can automatically illuminate, with ultraviolet light, the ultraviolet-reactive features of a payment card received within the container.

Embodiments of the present disclosure include a method comprising providing a container having a payment card contained therein; opening the container; and generating an ultraviolet light in response to opening the container. Generation of the ultraviolet light renders visible an ultraviolet-reactive feature of the payment card.

Embodiments of the present disclosure include a method comprising receiving a user identifier associated with a user having a payment account. The method further comprises determining one or more hidden features for use, wherein each of the one or more hidden features is visible when illuminated with ultraviolet light and undiscernible when illuminated with only visible light. The method further comprises producing a physical payment card associated with the payment account. Producing the physical payment card includes incorporating the one or more hidden features into the physical payment card.

Embodiments of the present disclosure include a system comprising one or more data processors; and a non-transitory computer-readable storage medium containing instructions which, when executed on the one or more data processors, cause the one or more data processors to perform operations of the aforementioned method.

Embodiments of the present disclosure include a computer-program product tangibly embodied in a non-transitory machine-readable storage medium, including instructions configured to cause a data processing apparatus to perform operations of the aforementioned method.

Embodiments of the present disclosure include a method comprising accessing a digital card associated with a physical card. The physical card has one or more hidden features and one or more conspicuous features. Each of the one or more hidden features is visible when illuminated with ultraviolet light and undiscernible when illuminated with only visible light. Each of the one or more conspicuous features is visible when illuminated with only visible light. The method further comprises presenting, as the digital card, a representation of the physical card. Presenting the representation includes displaying the one or more conspicuous features without displaying the one or more hidden features. The method further comprises receiving an activation signal and updating the representation of the physical card by displaying the one or more hidden features in response to receiving the activation signal.

Embodiments of the present disclosure include a system comprising one or more data processors; and a non-transitory computer-readable storage medium containing instructions which, when executed on the one or more data processors, cause the one or more data processors to perform operations of the aforementioned method.

Embodiments of the present disclosure include a computer-program product tangibly embodied in a non-transitory machine-readable storage medium, including instructions configured to cause a data processing apparatus to perform operations of the aforementioned method.

BRIEF DESCRIPTION OF THE DRAWINGS

The specification makes reference to the following appended figures, in which use of like reference numerals in different figures is intended to illustrate like or analogous components.

FIG. 19 is a block diagram of an example system architecture for implementing features and processes of the present disclosure.

DETAILED DESCRIPTION

Figure 1:
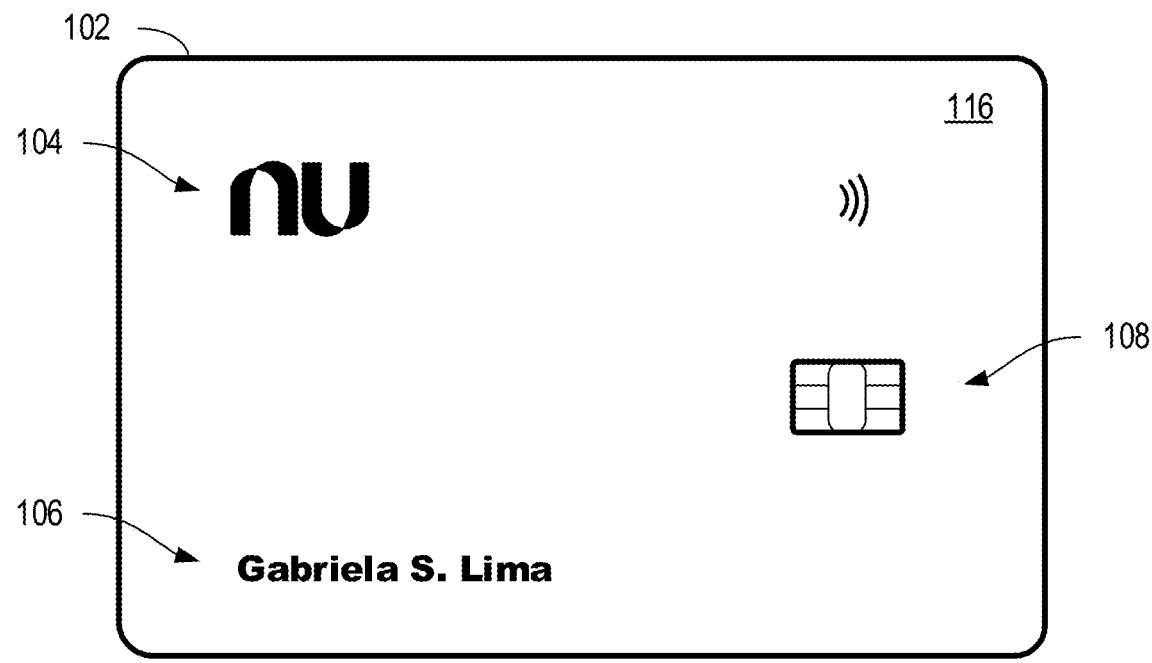
FIG. 1 is a front view of a payment card under visible light illumination, according to certain aspects of the present disclosure.

Certain aspects and features of the present disclosure relate to a payment card that includes hidden features (e.g., textual messages, graphics, emphasis features associated with conspicuous features of the payment card, or the like) undiscernible under only visible light, but discernable under ultraviolet (UV) light. The hidden features can be incorporated into multiple layers of a side of the payment card and can be present at different transparencies. A container (e.g., presentation box) can include a circuit to detect when the container is opened and cause the hidden features to be illuminated with UV light. The UV light source can be incorporated into the container itself, or can be incorporated into the payment card (e.g., activated by supplying a signal to the payment card from the container).

Certain aspects and features of the present disclosure relate to applying the hidden features during manufacturing. The hidden features can be i) selected (e.g., randomly or sequentially) from an available hidden features list; ii) supplied by user input; and/or iii) selected based on a user's previous hidden feature(s) (e.g., the same as or different from the previous hidden feature). A quality check can include comparing an image of the payment card illuminated under UV light with the selected hidden feature(s).

Certain aspects and features of the present disclosure relate to a digital version of the physical card that is established on a user device. During setup, the user device can receive data regarding the hidden features that are associated with the physical card. Under a normal state, the user device can display the digital card without displaying the hidden features. However, upon activation (e.g., when the digital card is used, when the physical card is used, when the physical card is in sufficient proximity, or the like), the user device can display the hidden features on the digital card.

As used herein, the term payment card is inclusive of any portable, physical token used to initiate a transaction and/or otherwise identify an account associated with a user (e.g., an identification card). In some cases, the term payment card can specifically refer to a payment card having a shape or size that is at or approximately the same as the ISO/IEC 7810 ID-1 standard (e.g., at or approximately 85.6 mm×53.98 mm×0.76 mm). In some cases, the term payment card specifically refers to a credit card, a debit card, a gift card, or a loyalty card. A payment card can be associated with an issuer (e.g., a financial institution, such as a bank or credit union; a company, such as a retail store or restaurant; or the like). In some cases, the term payment card refers to a physical token having an account communication feature (e.g., a magnetic strip, a contactless authentication circuit, or a contacting authentication circuit) and a conspicuous feature (e.g., a graphic or text that is visible when illuminated with only visible light). A conspicuous feature can be a printed feature (e.g., a name or logo printed in ink) or an embossed feature (e.g., a name stamped into a layer to create a relief).

As used herein, the term "visible" with reference to features of a payment card is intended to include features that are readily discernable with the naked eye, such as at a normal viewing distance (e.g., a distance of at or approximately 0.3 m, 0.4 m, 0.5 m, 0.6 m, 0.7 m, 0.8 m, 0.9 m, or 1 m). As used herein, the term "conspicuous feature" is intended to include features of the card that are visible under only visible light (e.g., light within the visible light spectrum, such as between 400-700 nm in wavelength), such as a cardholder's name printed in black ink or a logo printed in cyan, magenta, and yellow ink.

As used herein, the term "hidden" with reference to features of a payment card (e.g., UV-reactive features) is intended to include features that are not readily discernable under only visible light, but are readily discernable under UV light (e.g., light having a wavelength below 400 nm). A hidden feature or UV-reactive feature can be a feature that fluoresces under UV light. In some cases, a hidden feature or UV-reactive feature may be discernable under only visible light upon close inspection, but is not otherwise substantially discernable, readily discernable, or fully discernable by the naked eye at a normal viewing distance. In some cases, a hidden feature may fluoresce under certain ambient conditions, such as when exposed to sunlight containing UV light, which can provide a unique or desirable appearance. In some cases, a hidden feature can be implemented as a sunlight-hidden feature, in which case the opacity and/or shape of the hidden feature is selected to render the hidden feature not readily discernable under sunlight, but readily discernable under a dedicated UV light source, such as a UV light emitting diode (LED).

A payment card can be constructed of a number of layers. Examples of suitable layers include a substrate layer, a magnetic strip layer, a contactless technology layer, a contact technology layer, a layer containing conspicuous features, a layer containing hidden features (e.g., UV-reactive features), a security layer (e.g., containing holograms, microprinting, or other security features), and a protective layer. In some cases, conspicuous features can be implemented by printing on, depositing on, knocking out (e.g., cutting out) material from, embossing, or otherwise manipulating a layer of the payment card. For example, a conspicuous logo of a payment card can be implemented by cutting out a shape of the logo from a layer of colored material, then placing that layer above a layer with a different or contrasting color (e.g., a layer of silver foil). In some cases, the substrate layer can be made of metal, such as aluminum. In some cases, the magnetic strip layer can include a multi-track magnetic strip, such as a 2 track or 3 track magnetic strip.

A payment card can include a front face and a rear face. The front face generally includes a logo, a cardholder name, a contact technology circuit (e.g., EMV chip), and the like. The rear face generally includes a magnetic strip, a signature block, card issuer information, and the like. As used herein, the term "front face" and "rear face" can be used to describe the respective face of the substrate layer and all layers extending outward from the substrate layer on that respective side of the card. In an example, a front face may include, from the substrate layer and extending outwards, a contactless technology layer, a layer containing conspicuous features, a contact technology layer, one or more layers containing hidden features, and a security layer.

Certain aspects of the present disclosure relate to a payment card including at least a substrate layer, a layer containing conspicuous features, and one or more layers containing hidden features. In some cases, the payment card includes at least two layers containing hidden features on the same face. In some cases, the two layers containing hidden features on the same face include at least a first hidden feature on a first layer and a second hidden feature on a second layer that overlap.

Each layer containing hidden features that are UV-reactive features can be referred to as a UV-reactive layer. The UV-reactive features can be printed or otherwise deposited or incorporated onto a substantially transparent (e.g., transparent to at least visible light or visible light and at least some UV light) material. The UV-reactive features can be printed or otherwise deposited with different degrees of opacity (e.g., transmittance). For example, a first UV-reactive feature can be printed with a 50% opacity and a second UV-reactive feature can be printed with a 90% opacity. Any suitable technique can be used to achieve desired opacity, ink application coverage, ink density, dithering, or the like. Opacity of a UV-reactive feature can be measured under ultraviolet light conditions, although that need not always be the case. In some cases, instead of identifying and comparing a UV-reactive feature by its opacity, the same UV-reactive feature can be identified and compared based on its transparency.

In some cases, a payment card as disclosed herein can include at least a first UV-reactive feature and a second UV-reactive feature, with the first UV-reactive feature having a different degree of opacity than the second UV-reactive feature. Thus, the different degrees of opacity cause the first UV-reactive feature to fluoresce with different intensity than the second UV-reactive feature, thus permitting the creation of complex patterns and gradients using UV-reactive ink.

In some cases, UV-reactive features can be of different fluorescing colors. For example, a first UV-reactive feature can fluoresce primarily with a first color (e.g., a first wavelength) and a second UV-reactive feature can fluoresce primarily with a different, second color (e.g., a different, second wavelength). Thus, the use of multiple fluorescing colors or fluorescing wavelengths can be used to create complex patterns and gradients, or even full-color graphics.

In some cases, UV-reactive features can fluoresce for a period of time after UV light is removed (e.g., a UV-reactive feature's persistence). In some cases, different UV-reactive features can each have a different persistence. For example, a first UV-reactive feature can cease fluorescing immediately after removal of the UV light, and a second UV-reactive feature can continue fluorescing for tens of seconds after removal of the UV light. Thus, the use of UV-reactive features with differing persistence can be used to create interesting and dynamic graphics.

In some cases, hidden features are in the form of graphical elements, such as lines, circles, gradients, shapes, curves, and the like. Multiple hidden features can be combined to create a desired graphical element, such as a desired pattern, design, or logo.

In some cases, hidden features can be associated with conspicuous features. For example, a hidden feature can enhance, obscure, or emphasize a conspicuous feature. In an example, a conspicuous feature that includes only the first name of the cardholder can be enhanced by a hidden feature that includes the last name of the cardholder. In such an example, under visible light, only the first name of the cardholder is discernable, but when UV light is applied, both the first name and last name are discernable.

In another example, a conspicuous feature that includes a collection of text (e.g., large string of letters or words) can be obscured by a hidden feature, such that a portion of the collection of text is obscured. In such an example, under visible light, the full collection of text may be visible, but when UV light is applied, the hidden feature obscures certain portions of the collection of text, leaving the remaining letters and/or words to spell out a message. For example, the collection of text "You can illuminate this area with special light" under visible light can be rendered into the following message under UV light, with the dashes representing obscured letters: "You--- ---------- ---- are- ---- special -----."

In another example, a conspicuous feature that is a corporate logo can be emphasized by a hidden feature, such that attention is called to the conspicuous feature when UV light is applied. In such an example, a standard logo may appear under visible light, but when UV light is applied, the standard logo may appear with a drop shadow or surrounded by highlights to give an embossed effect.

In some cases, hidden features can be textual messages. Textual messages can include one or more strings of alphanumeric characters and/or words. In an example, the textual message can be a motivational phrase. In some cases, a textual message can include emoji.

A payment card can include any combination of hidden features. Each hidden feature can be incorporated into the payment card during manufacture. A production system can be used to manufacture payment cards. The production system can include one or more computing devices, as well as other suitable equipment usable to manufacture payment cards. For example, a production system can include a computer for determining what hidden feature to print onto a given UV layer, a printer for outputting the hidden feature onto the UV layer material, and a lamination machine for laminating together the layers of the payment card. In some cases, the production system can communicate with a separate computing device (e.g., server) to help determine what hidden feature(s) to use for a given payment card.

In some cases, a production system can independently decide one or more hidden feature(s) to include on any given payment card during manufacturing. In some cases, the independent decision can be to sequentially apply certain hidden features from a database (e.g., list) of potential hidden features. For example, a production system can create one or more cards containing a first hidden feature (e.g., a first message on a list of messages), then subsequently move on to creating one or more cards containing a second hidden feature (e.g., a second message of the list of messages). In some cases, the independent decision can be to randomly (e.g., randomly or pseudo-randomly) apply certain hidden features from a database of potential hidden features. In some cases, a production system can automatically apply the same hidden feature to every payment card. For example, a production system applying hidden features to payment cards that all contain the same corporate logo can automatically apply the same hidden feature that is designed to emphasize the corporate logo.

In some cases, one or more of the hidden features included on a payment card can be generated based on user input. In such cases, a user can provide input that is used as the hidden feature or used to select or generate the hidden feature. In one example, a user may provide as input their favorite quote from an author, in which case the production system can use that favorite quote as a message of a hidden feature. In another example, a user may be given a list of potential hidden features and can provide user input in the form of a selection of which of the potential hidden features they would like to use, in which case the production system can use that user input to incorporate the selected hidden feature into the user's payment card.

In some cases, the production system can include a quality checking system for performing a quality checking process. The quality checking system can include an ultraviolet light source that illuminates one or more payment cards and an imager (e.g., a camera) that obtains image data associated with the one or more payment cards. The image data can be processed to identify what detected hidden features are detected on the payment cards. The quality checking system can then compare the image data (e.g., the detected hidden features discerned from the image data) to the hidden features intended to be incorporated into the payment cards. If the comparison is a match or within a threshold tolerance level, the payment card can be approved for distribution. However, if the comparison is not a match or outside of a threshold tolerance level, the payment card can be held for manual inspection, destroyed, and/or re-manufactured.

In some cases, one or more of the hidden features included on a payment card can be determined based on a user identifier (ID). A user ID can by any unique identifier usable to identify the user and/or the user's account. In some cases, a user ID is an account number, although that need not always be the case. The production system can use the user ID to identify a set of potential hidden features that may be used for subsequent sequential or random selection (e.g., the particular type or tier of payment card associated with the user ID can dictate which hidden features can be used and/or cannot be used). In some cases, the production system can use the user ID to identify one or more historical hidden features (e.g., a hidden message used in an immediately previous payment card issued to that same user ID). In some cases, a historical hidden feature can be used to ensure the same hidden feature is included on the user's new payment card (e.g., to ensure a replacement card contains the same hidden message as an expiring card). In some cases, a historical hidden feature can be used to ensure a different hidden feature is included on the user's new payment card (e.g., to ensure a replacement card contains a different hidden message from a lost card). In some cases, other information associated with the user ID can be used to generate a hidden feature (e.g., generating a location-specific hidden feature based on location information associated with the user ID or automatically translating a hidden message based on language information associated with the user ID).

In some cases, the production system can store hidden feature information in association with a user ID. For example, after a production system has incorporated one or more given hidden features onto a payment card associated with a given user ID, information about which hidden feature(s) were used can be stored in association with the given user ID. In some cases, this hidden feature information can be used as a source of historical hidden features when a subsequent card is being manufactured. In some cases, this hidden feature information can be leveraged to provide advanced functionality to other systems (e.g., a digital card, as disclosed in further detail herein) or products (e.g., manufacturing a checkbook for a user with the same or complimentary hidden features as the user's payment card).

In some cases, a digital card can be associated with a physical payment card. The digital card can be a digital representation of the physical payment card on a user device, such as a smartphone, smartwatch, wearable device, tablet, computer, or the like. In some cases, the digital card can be used to initiate transactions (e.g., make purchases, withdraw money, record visits, and the like). For example, a digital card in a smartphone or smartwatch can use contactless technology (e.g., RF-based contactless technology, such as near field connect (NFC) or radiofrequency identification (RFID) technology; or 2-dimensional code-based technology, such as quick response (QR) codes and barcodes) to initiate the transaction. The digital card is associated with the physical payment card, such that a transaction initiated by the digital card can have the same or similar affect as if the transaction were initiated by the physical card. For example, paying for a meal with a digital card can result in a debit from the same account that would be debited if the meal were paid for using the physical payment card.

The digital card can be displayed on the user device and can be a representation of the physical payment card. This representation can look the same as or similar to the physical payment card. The normal state of this representation can be to display conspicuous features of the physical payment card, but not display hidden features. However, upon receipt of an activation signal, the hidden feature(s) of the physical payment card can be displayed on the representation. Such display can occur for an established time period (e.g., 5 seconds, 10 seconds, and the like), indefinitely, or until a deactivation signal is received (e.g., the user taps on the touchscreen or shakes the user device).

In some cases, the activation signal can be a user input, such as the user depressing a button, tapping a touchscreen, shaking the user device, or the like. For example, the digital card can be displayed on a user's smartphone without hidden features until the user shakes the smartphone, at which time the hidden features temporarily appear.

In some cases, the activation signal can be associated with a transaction, such as a signal indicative of a transaction attempt by the user device (e.g., a signal indicative of the smartphone being in range of a contactless payment device, a signal indicative of the smartphone successfully transmitting account information for a transaction, a signal indicative that the account information has been received by the contactless payment device, or a signal indicative that the transaction has been confirmed).

In some cases, the activation signal can be associated with a transaction confirmation, such as a transaction confirmation of a transaction performed using the physical payment card. For example, in response to making a transaction using the physical payment card, the user device can receive a confirmation of the transaction, in which case the user device can temporarily display the hidden features on the digital card's representation of the physical payment card.

In some cases, the activation signal can be associated with a proximity of the physical payment card. For example, a sensor in the user device (e.g., an RF transceiver) can detect an approximate or relative proximity of the physical payment card. When the proximity level exceeds a threshold (e.g., indicative that the physical payment card is within 1 cm, 2 cm, 3 cm, 4 cm, 5 cm, 10 cm, 15 cm, or 20 cm), the user device can temporarily display the hidden features on the digital card's representation of the physical payment card.

In some cases, instead of displaying a hidden feature on the representation of the physical payment card, the user device can present the hidden feature or a complementary feature associated with the hidden feature in an alternate fashion. For example, the hidden feature can be flashed on the screen, a vibration pattern associated with the hidden feature can be output by a haptic feedback component of the user device, and/or the text of a hidden message can be ready by a text-to-speech interpreter of the user device.

In some cases, a payment card with a hidden feature can include an integrated light source. The integrated light source can be any suitable light source for generating UV light, such as an LED. The integrated light source can be incorporated into the card in any suitable fashion, such as being embedded between layers. In some cases, the integrated light source can be powered by an integrated power source (e.g., battery or capacitor). In an example, the user can cause hidden features to be displayed on command by depressing a button that causes the integrated light source to illuminate with UV light. In some cases, the integrated light source can be powered by an external power source electrically coupled to the payment card (e.g., an external power source connected to electrode contacts on a surface of the payment card). In an example, the integrated light source can be powered by a container in which the payment card is stored, such as described in further detail herein. In some cases, the integrated light source can be powered by an external signal, such as an RF signal or magnetic induction. In such cases, the external signal can generate a current in an antenna or coil of wires integrated in the payment card, which current can be directed to the integrated light source to generate UV light. In an example, the integrated light source can illuminate with UV light whenever the payment card is brought near a contactless payment transceiver.

Certain aspects and features of the present disclosure relate to a container for use with the payment card disclosed herein. The container can be a presentation box, a storage box, a wallet, or other suitable container for storing the payment card. In some cases, the container is a presentation box or envelope used to initially deliver the payment card to an end user. The container can include a payment card receiving space for holding or storing a payment card. The container can include a power source that provides power to generate UV light. The container can generate UV light by providing power to one or more UV light sources integrated into the container (e.g., positioned in or on a wall or flap of the container and directed towards the payment card receiving space) or by providing a signal (e.g., an RF signal or a magnetic induction signal) to a payment card with an integrated light source.

In some cases, the container can continuously generate UV light, such as after a preset delay (e.g., start generating UV light after a 24 hour shipping delay) however that need not always be the case. In some cases, the container can include a container detector that can identify when the container is in an open configuration. This container detector can be used to cause UV light to be generated in response to the container being in the open configuration. The open configuration can depend on the shape and type of container. In some cases, a container is in a closed configuration when its interior is not accessible and/or not visible from outside the container, and in an open configuration when its interior is accessible and/or visible from outside the container. In some cases, a container being in an open configuration can include a payment card being moved from its receiving space to a location where a face of the payment card is at least partially visible from outside the container. For example, when the container is a box with a cover that removably couples to a base, the container can be in a closed configuration when the cover is covering the base and can be in an open configuration when the cover is removed from or separated from the base. In another example, when the container is an envelope, the envelope can be in a closed configuration when one or more of its flaps are folded, but can be in an open configuration when one or more of its flaps are unfolded. In another example, when the container is a wallet, the container can be in a closed configuration when the payment card is fully inserted in its receiving space and not substantially visible from outside the wallet (e.g., one or both faces of the payment card are not visible), and can be in an open configuration when the payment card is partially removed from its receiving space or the opening providing access to the receiving space is stretched sufficiently to permit a face of the payment card to be substantially visible from outside the wallet.

In some cases, the container can include a card detector. The card detector can detect whether or not the payment card is received within the payment card receiving space, or the approximate or relative proximity of the payment card to the payment card receiving space. The card detector can be used to activate and/or lockout the generation of UV light. For example, even if a container detector detects that the container is in an open configuration, if the card detector does not detect a payment card in the payment card receiving space, UV light will not be generated. However, once the payment card is then detected in the payment card receiving space, UV light will be generated.

Aspects and features of the present disclosure can be used to provide payment cards and payment card experiences that are unique and desirable. Certain aspects of the present disclosure can improve user engagement and intrigue. The use of UV-reactive features can provide memorable moments when the user makes use of the payment card in environments with substantial ultraviolet light (e.g., in sunlight, in dance clubs, or the like). Unlike the use of UV-reactive material for security features, certain aspects and features of the disclosed hidden features provide improved user experience and can impact the desirability and enjoyment of the payment card.

For purposes of the present detailed description, unless specifically disclaimed and as appropriate, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances of," or any logical combination thereof.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a front view of a payment card 102 under visible light illumination, according to certain aspects of the present disclosure. The front view depicts the front face 116 of the payment card 102. Visible on the front face 116 in visible light illumination (e.g., only visible light and no ultraviolet light) are various conspicuous features, such as a logo 104 and a name 106. In some cases, one or more of these conspicuous features can be removed and/or other conspicuous features can be included.

The payment card 102 can include a contact circuit 108 for performing contact-based transactions. The contact circuit 108 can be an EMV chip or other suitable smartcard chip. The payment card 102 can be contactless-enabled, thus including contactless technology suitable for engaging in contactless transactions via RF signal.

Payment card 102 contains hidden features that are not visible under visible light illumination.

Figure 2:
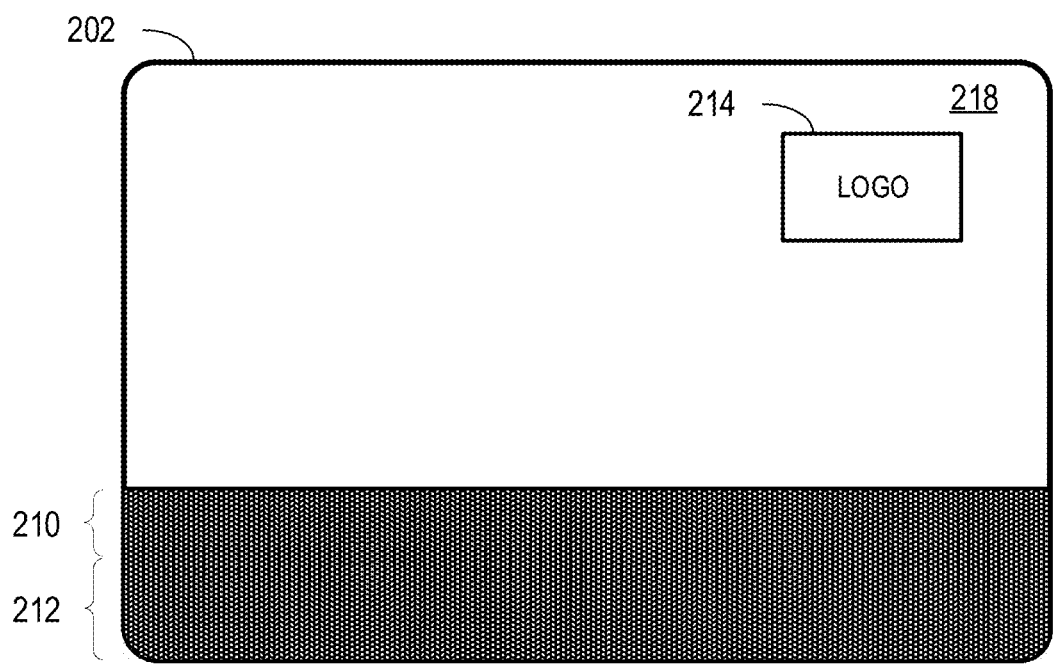
FIG. 2 is a rear view of a payment card under visible light illumination, according to certain aspects of the present disclosure.

FIG. 2 is a rear view of a payment card 202 under visible light illumination, according to certain aspects of the present disclosure. Payment card 202 can be any suitable payment card, such as payment card 102 of FIG. 1. The rear view depicts the rear face 218 of the payment card 202. Visible on the rear face 218 in visible light illumination (e.g., only visible light and no ultraviolet light) is the conspicuous feature of a rear logo 214. In some cases, this conspicuous feature can be removed and/or other conspicuous features can be included.

Present on the rear face 218 of the payment card 202 is a magnetic strip 210. In some cases, a strip-pigmented region 212 can be included. The strip-pigmented region 212 can extend from the magnetic strip 210 to an edge (e.g., bottom edge as depicted in FIG. 2) of the payment card 202. This strip-pigmented region 212 can be of the same color as the magnetic strip 210, such that the interface between the magnetic strip 210 and the strip-pigmented region 212 appears to disappear. Use of a strip-pigmented region 212 can provide desirable aesthetic qualities to the payment card 202.

Payment card 202 contains hidden features that are not visible under visible light illumination.

Figure 3:
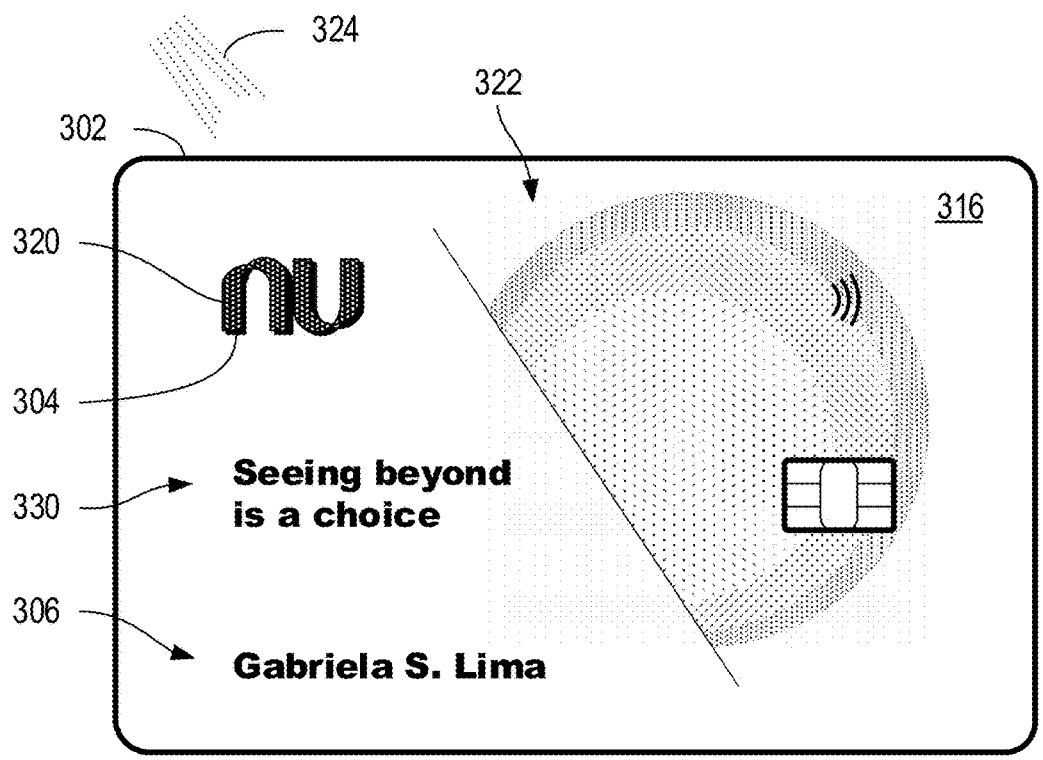
FIG. 3 is a front view of a payment card under ultraviolet illumination, according to certain aspects of the present disclosure.

FIG. 3 is a front view of a payment card 302 under ultraviolet illumination, according to certain aspects of the present disclosure. Payment card 302 can be any suitable payment card, such as payment card 102 of FIG. 1. Payment card 302 can be payment card 102 of FIG. 1 while being exposed to UV light 324. UV light 324 can originate from any suitable source, such as sunlight or a UV light source (e.g., UV LED).

When exposed to UV light 324, conspicuous features (e.g., logo 304 and name 306) may remain visible, but hidden features become newly visible. Various hidden features are depicted on the front face 316 of payment card 302, such as a logo emphasis feature 320, a hidden message 330, and a graphic feature 322.

The logo emphasis feature 320 is an emphasis hidden feature that is associated with a conspicuous feature, specifically logo 304. When the payment card 302 is under UV illumination, the logo emphasis feature 320 appears, providing extra emphasis and/or drawing attention to logo 304. As depicted in FIG. 3, the logo emphasis feature 320 provides an offset version of logo 304, which can create a floating effect that emphasizes logo 304.

The hidden message 330 contains alphanumeric characters and/or words, specifically the phrase "Seeing beyond is a choice." When the payment card 302 is under UV illumination, the hidden message 330 appears, permitting an onlooker to view and read the otherwise undiscernible message. The hidden message 330 can convey aesthetic messages (e.g., appealing-looking text), motivational messages (e.g., inspirational phrases), informational messages (e.g., information about the payment card 302, associated account, or associated issuer), or other suitable messages.

The graphic feature 322 is a set of shapes and gradients designed to provide a pleasing, desirable, and/or identifiable image. The graphic feature 322 can be used to enhance brand identity or otherwise provide an aesthetic design to the payment card 302. In some cases, the graphic feature 322 can provide an information design (e.g., a chart of credit limits).

Figure 4:
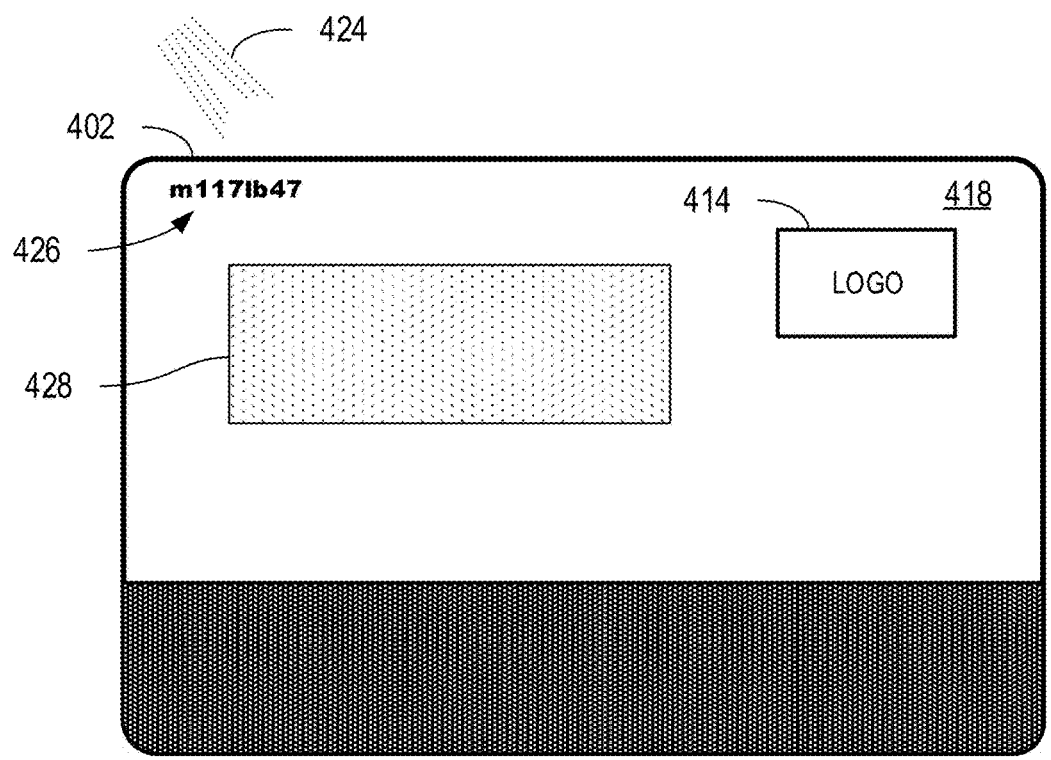
FIG. 4 is a rear view of a payment card under ultraviolet illumination, according to certain aspects of the present disclosure.

FIG. 4 is a rear view of a payment card 402 under ultraviolet illumination, according to certain aspects of the present disclosure. Payment card 402 can be any suitable payment card, such as payment card 102 of FIG. 1. Payment card 402 can be payment card 102 of FIG. 1 while being exposed to UV light 424. UV light 424 can originate from any suitable source, such as sunlight or a UV light source (e.g., UV LED).

When exposed to UV light 424, conspicuous features (e.g., rear logo 414) may remain visible, but hidden features become newly visible. Various hidden features are depicted on the rear face 418 of payment card 402. Hidden feature 428 can be any suitable hidden feature, such as a message, a graphic, or the like. In some cases, hidden feature 428 can be an information message, such as information about the issuer of the payment card 402.

In addition to hidden features, the payment card 402 can include one or more UV-reactive security features 426. A UV-reactive security feature 426 can be similar to a hidden feature or can be a type of hidden feature. The UV-reactive security feature 426 can include a code, graphic, symbol, or other discernable element that is visible when exposed to UV light 424. Here, UV-reactive security feature 426 is a security code.

Figure 5:
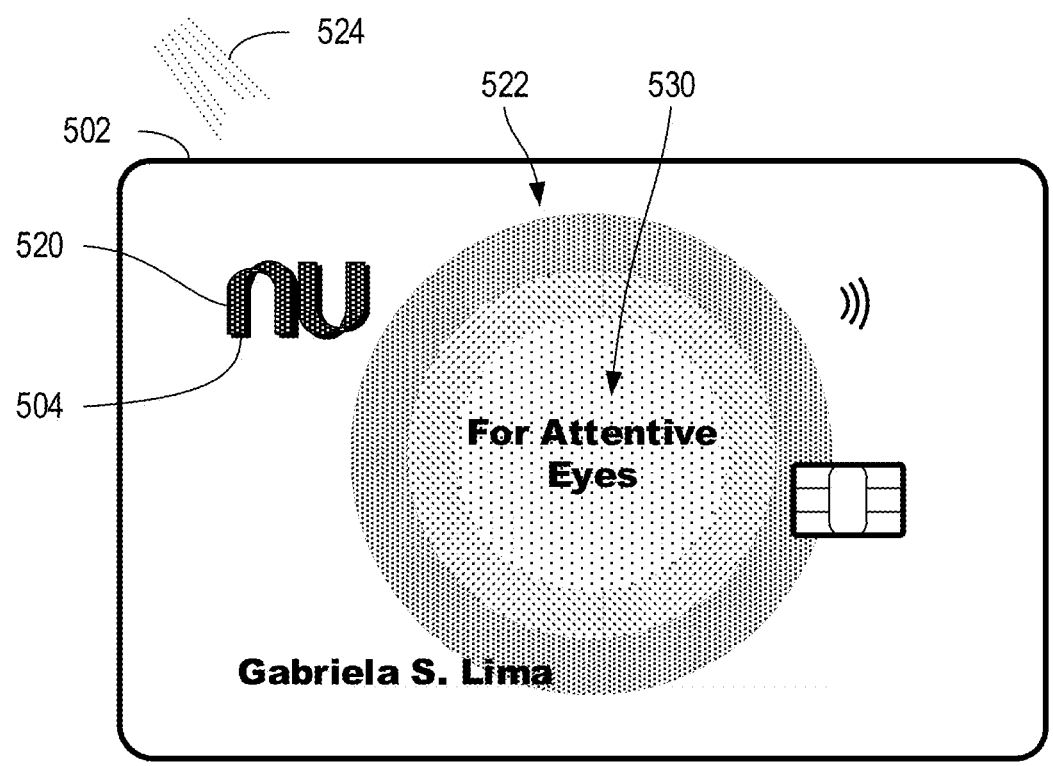
FIG. 5 is a front view of a payment card with a first alternate configuration under ultraviolet illumination, according to certain aspects of the present disclosure.

FIG. 5 is a front view of a payment card 502 with a first alternate configuration under ultraviolet illumination, according to certain aspects of the present disclosure. Payment card 502 can be any suitable payment card, such as payment card 102 of FIG. 1. Payment card 502 can be payment card 102 of FIG. 1 while being exposed to UV light 524. UV light 524 can originate from any suitable source, such as sunlight or a UV light source (e.g., UV LED).

Payment card 502, being in a first alternate configuration, includes hidden features (e.g., graphic feature 522 and hidden message 530) that differ from those of the payment card 302 of FIG. 3, as well as at least one hidden feature (e.g., logo emphasis feature 520 emphasizing logo 504) that is shared with the payment card 302 of FIG. 3.

Graphic feature 522 can be implemented via UV-reactive material (e.g., UV-reactive ink) present on one or multiple layers of the payment card 502. In an example, graphic feature 522 takes the form of UV-reactive ink applied to a first layer of the payment card 502. The UV-reactive ink is applied such that the opacity of the graphic feature 522 decreases from the center of graphic feature 522 towards the outer edges of graphic feature 522. As such, graphic feature 522, when illuminated with UV light 524, appears as a circular gradient that is brighter near its center and darker towards its edges. In some cases, the gradient can appear to blend into the background color of the payment card 502 itself.

Hidden message 530 can be implemented on a second layer of the payment card 502, such as a layer above the first layer (e.g., a layer further from the substrate layer of the payment card 502 than the first layer, such as a layer closer to the viewer than the first layer as depicted in FIG. 5). Thus, when the effect of the hidden message 530 is to appear overlaid on the graphic feature 522. The use of multiple layers for different hidden features and/or different components of a hidden feature can enable complex designs.

Figure 6:
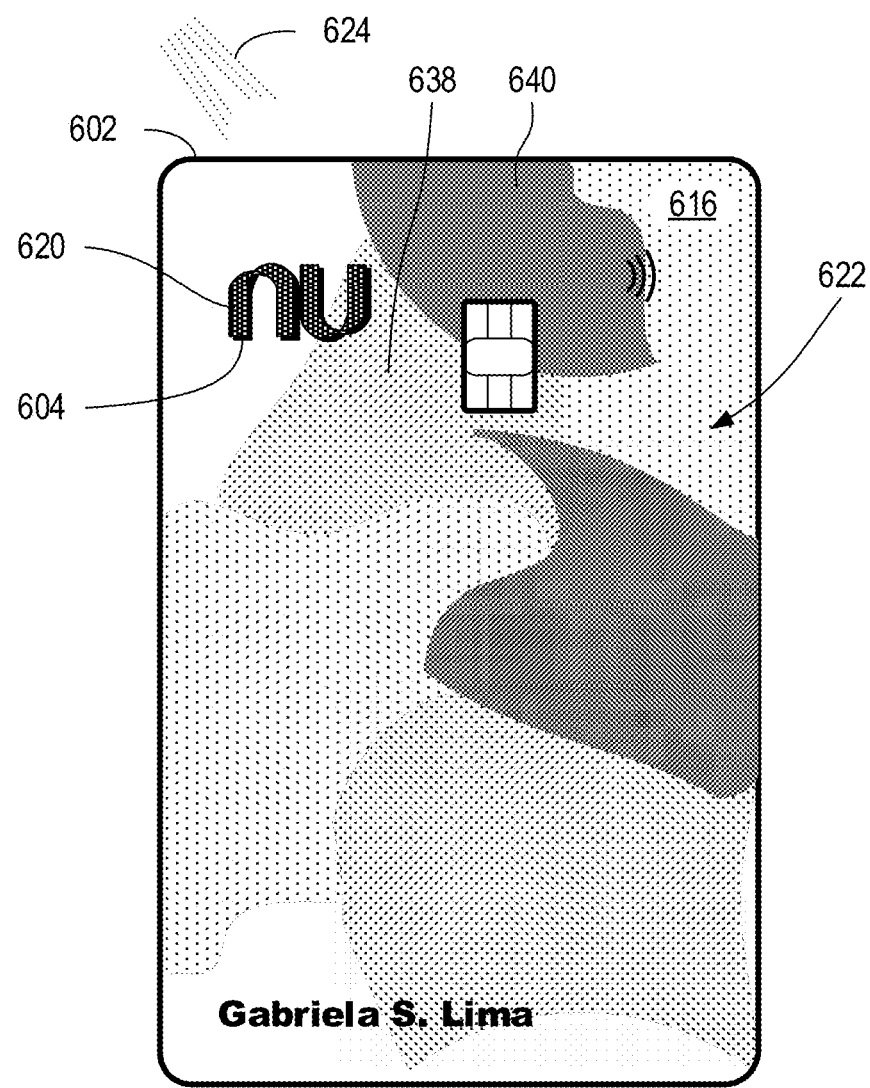
FIG. 6 is a front view of a payment card with a second alternate configuration under ultraviolet illumination, according to certain aspects of the present disclosure.

FIG. 6 is a front view of a payment card 602 with a second alternate configuration under ultraviolet illumination, according to certain aspects of the present disclosure. Payment card 602 can be any suitable payment card, such as payment card 102 of FIG. 1. Payment card 602 can be payment card 102 of FIG. 1 while being exposed to UV light 624. UV light 624 can originate from any suitable source, such as sunlight or a UV light source (e.g., UV LED).

Payment card 602, being in a second alternate configuration, includes hidden features (e.g., graphic feature 622) that differ from those of the payment card 302 of FIG. 3, as well as at least one hidden feature (e.g., logo emphasis feature 620 emphasizing logo 604) that is shared with the payment card 302 of FIG. 3.

The graphic feature 622 of payment card 602 is implemented as a collection of shapes that occupy most of the front face 616 of the payment card 602. Graphic feature 622 can be made of multiple components parts. Each component part can be considered its own hidden feature. For example, graphic feature 622 includes at least first component 638 and second component 740. In payment card 602, the first component 638 is implemented on a first layer of the payment card 602, while the second component 640 is implemented on a second layer of the payment card 602. A portion of the second component 640 overlaps the first component 638. Thus, when illuminated by UV light 624, the second component 640 covers at least some of the first component 638. The use of overlapping hidden features can further enable complex designs.

Figure 7:
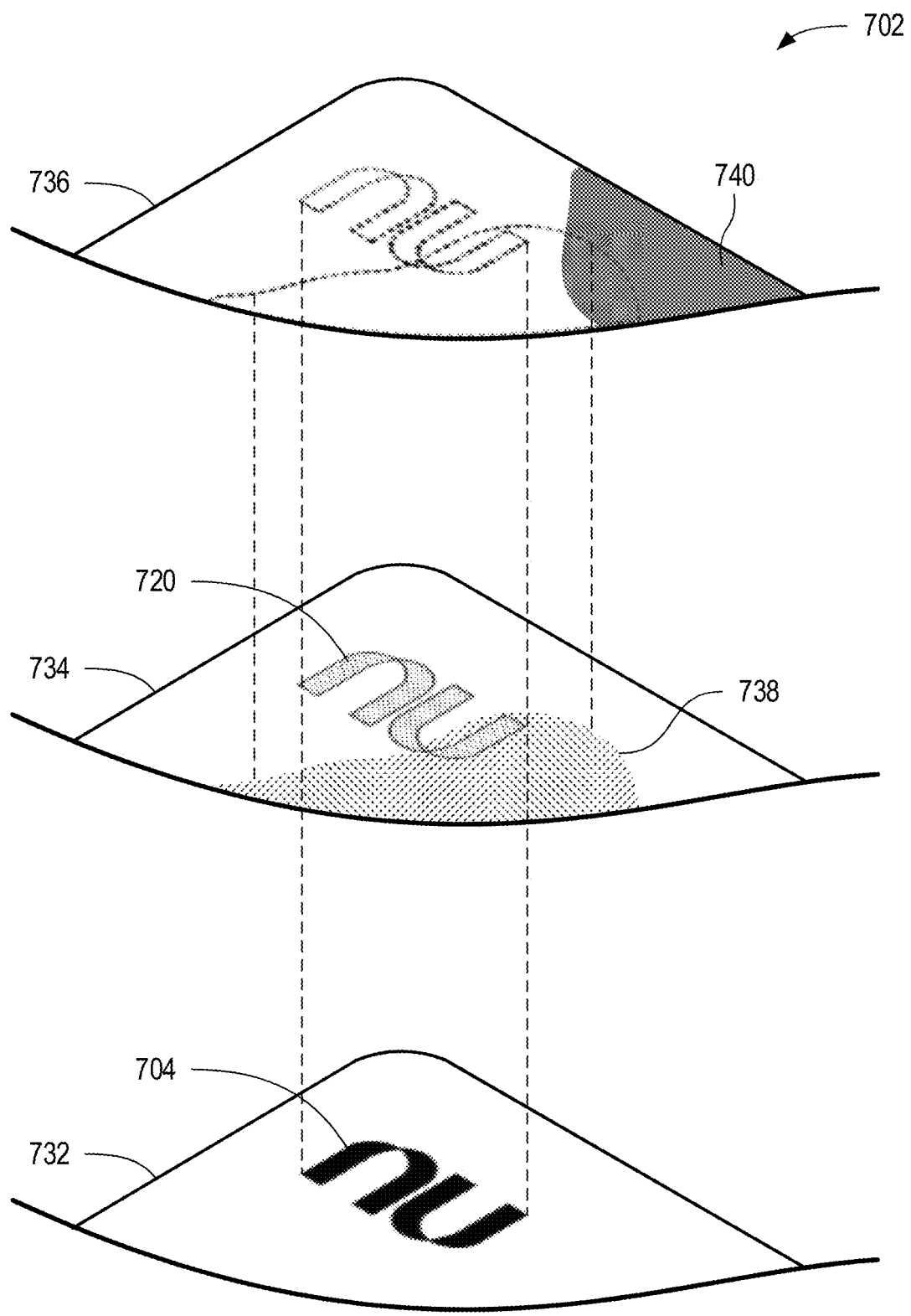
FIG. 7 is a partial exploded view of the UV-reactive layers and a print layer of a payment card, according to certain aspects of the present disclosure.

FIG. 7 is a partial exploded view of the UV-reactive layers 734, 736 and a print layer 732 of a payment card 702, according to certain aspects of the present disclosure. Payment card 702 can be any suitable payment card, such as payment card 102 of FIG. 1. Payment card 702 can be payment card 602 or can have hidden features that are the same as those of payment card 602. For illustrative purposes, vertical dashed lines are included to depict how features on a lower layer line up with those on an upper layer. Additionally, the outlines of features from layers below the second UV-reactive layer 736 are depicted in the UV-reactive layer 736 in dashed lines for illustrative purposes. While only the UV-reactive layers 734, 736 and a print layer 732 of payment card 702 are depicted, payment card 702 may include additional layers, such as at least a substrate layer. In some cases, however, the print layer 732 is also the substrate layer.

As used herein, a layer being "below" another layer is a layer that is located closer to the substrate layer of the payment card 702 than the other layer. As depicted in FIG. 7, the print layer 732 is located below the first UV-reactive layer 734, which is itself located below the second UV-reactive layer 740.

The print layer 732 can be a layer containing one or more conspicuous features, such as logo 704. The print layer 732 can included printed text, logos, or other graphics.

Above the print layer 732, the first UV-reactive layer 734 can include one or more hidden features (e.g., hidden features or components of aggregate hidden features). As shown, first UV-reactive layer 734 includes a logo emphasis feature 720 and a first component 738.

Above the first UV-reactive layer 734, the second UV-reactive layer 736 can include one or more hidden features. As shown, second UV-reactive layer 736 includes a second component 740. The second component 740 overlaps a portion of the first component 738. Thus, when illuminated with UV light, the degree of opacity of the second component 740 will affect how much UV light reaches the covered portion of the first component 738 and will affect the amount of fluoresced light from the first component 738 that is able to be transmitted through the second UV-reactive layer 736 to an onlooker's eyes. Thus, the overlapping nature of first component 738 and second component 740 enable the second component 740 to entirely block a portion of the first component 738 or partially block a portion of the first component 738. This overlapping of hidden features further enables complex designs.

Figure 8:
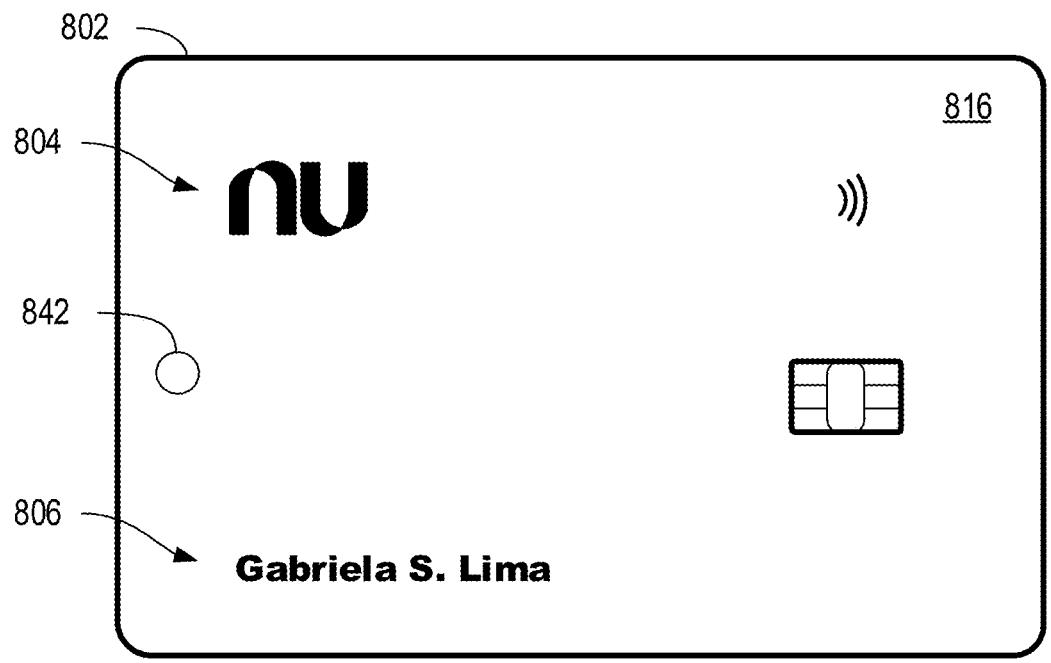
FIG. 8 is a front view of a self-illuminating payment card under visible light illumination, according to certain aspects of the present disclosure.

FIG. 8 is a front view of a self-illuminating payment card 802 under visible light illumination, according to certain aspects of the present disclosure. Payment card 802 can be any suitable payment card, such as a payment card similar to payment card 102 of FIG. 1.

Visible on the front face 816 in visible light illumination (e.g., only visible light and no ultraviolet light) are various conspicuous features, such as a logo 804 and a name 806. In some cases, one or more of these conspicuous features can be removed and/or other conspicuous features can be included.

The payment card 802 can include an integrated light source 842 capable of outputting UV light. The light source 842 can be integrated into the payment card 802 in any suitable fashion, such as being laminated between layers of the payment card 802. The light source 842 can be visible when looking at the front face 826, although that need not always be the case. The light source 842 can be any suitable light source for outputting UV light, such as a UV LED.

Payment card 802 contains hidden features that are not visible under visible light illumination.

Figure 9:
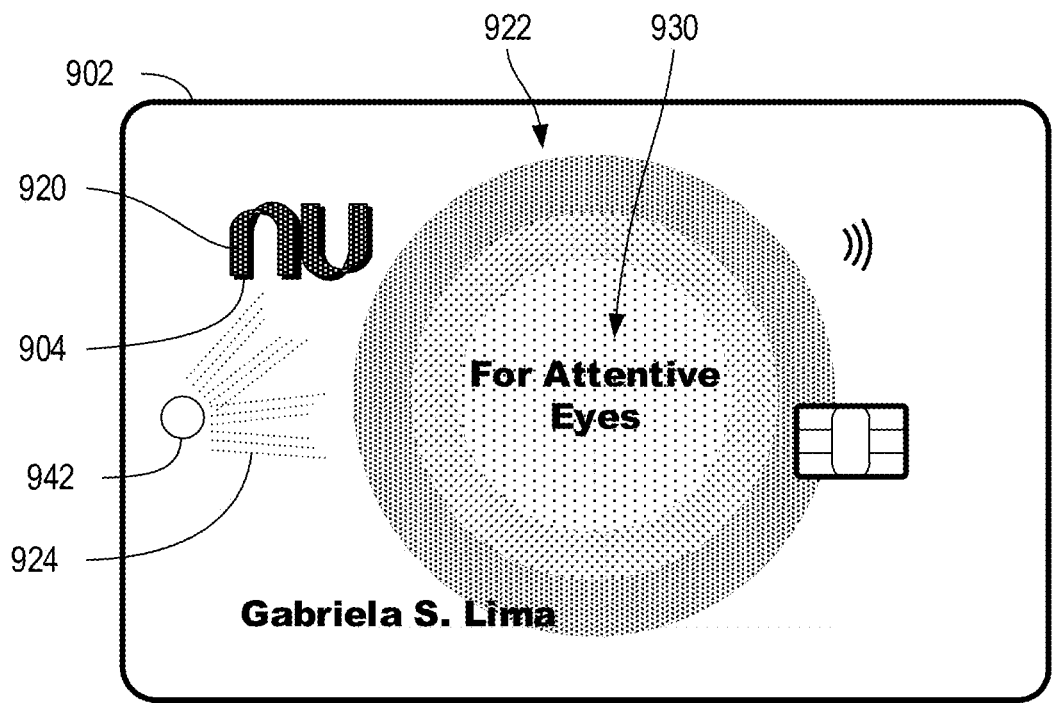
FIG. 9 is a front view of a self-illuminating payment card being self-illuminated with ultraviolet illumination, according to certain aspects of the present disclosure.

FIG. 9 is a front view of a self-illuminating payment card 902 being self-illuminated with ultraviolet illumination, according to certain aspects of the present disclosure. Payment card 902 can be any suitable payment card, such as a payment card similar to payment card 102 of FIG. 1. Payment card 902 can be payment card 802 of FIG. 8 after activation of its light source 842. Activation of the light source 842 can cause UV light 924 to be generated from the light source 842. The light source 842 can be positioned to direct UV light 942 towards one or more hidden features of the payment card 902. In some cases, a light-piping layer can be implemented in the payment card 902 to help direct the UV light 942 from the light source 942 to other portions of the payment card 902.

When exposed to the UV light 924 from the light source 942, conspicuous features (e.g., logo 904 and name 906) may remain visible, but hidden features (e.g., a logo emphasis feature 920, a hidden message 930, and a graphic feature 922) become newly visible.

In some cases, light source 942 can be activated by actuating a sensor (e.g., depressing a button) on the payment card 902. In some cases, payment card 902 can include a power source for supplying power to the light source 942. In some cases, light source 942 can be activated by receiving power from an antenna or induction coil, which in turn receives power from an external transmitter (e.g., an RF transmitter or an induction power transmitter). In some cases, light source 942 can be activated by receiving power from an external power source via electrical contacts on the payment card (e.g., electrical contacts that make an electrical connection with a power source when the payment card is inserted into a corresponding payment card reader).

Figure 10:
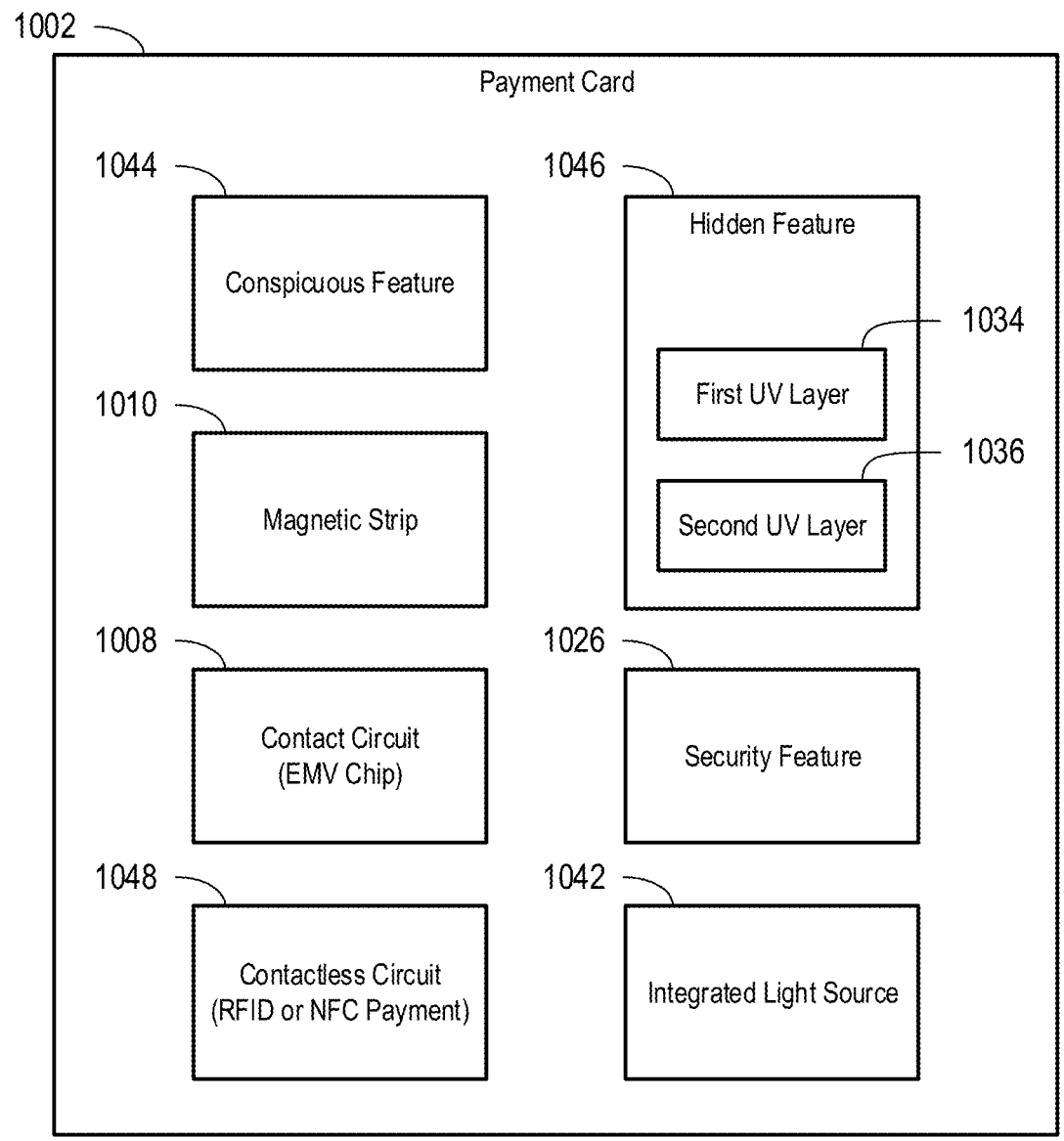
FIG. 10 is a schematic diagram of a payment card, according to certain aspects of the present disclosure.

FIG. 10 is a schematic diagram of a payment card 1002, according to certain aspects of the present disclosure. Payment card 1002 can be any suitable payment card, such as payment card 102. Payment card 1002 is depicted with various components, although in some cases, payment card 1002 can be implemented with fewer and/or additional components.

Payment card 1002 can include at least one conspicuous feature 1044. The conspicuous feature 1044 is a feature (e.g., text, a graphic, an image, or any other suitable design element) that is visible when illuminated with only visible light (e.g., not also illuminated with UV light). Common conspicuous features 1044 include a user name, an issuer logo, and the like.

Payment card 1002 can include at least one magnetic strip 1010. Magnetic strip 1010 can be any suitable magnetic strip 1010 for storing and conveying information, such as account information associated with the user of the payment card 1002. Account information can include an account number, a user identifier, the user's name, or other suitable information.

Payment card 1002 can include at least one contact circuit 1008. The contact circuit is a circuit that is integrated into the payment card 1002 for enabling contact-based communication. A common example of a contact circuit is an EMV chip. Any suitable smartcard chip can be used. The contact circuit can include an integrated circuit, electrical contacts, connectors, and/or any other components necessary to enable the contact circuit to perform contact-based communication.

Payment card 1002 can include at least one contactless circuit 1048. The contactless circuit 1048 is a circuit that is integrated into the payment card 1002 for enabling contactless (e.g., RF) communication. Common examples of contactless circuits 1048 include NFC circuits and RFID circuits, although other contactless protocols can be used. The contactless circuit 1048 can include an integrated circuit, an antenna or coil, and/or any other components necessary to enable the contactless circuit to perform contactless communication.

Payment card 1002 can include at least one hidden feature 1046. This hidden feature 1046 can be non-discernable under only visible light, but can be readily discernable under UV light. The hidden feature 1046 can be fluorescent under UV light. The hidden feature 1046 can be formed of one or more components, each of which can be considered a hidden feature). In some cases, hidden feature 1046 is implemented on at least a first UV layer 1034. In some cases, hidden feature 1046 is implemented on at least a first UV layer 1034 and a second UV layer 1036, such as with a first component implemented on the first UV layer 1034 and a second component implemented on the second UV layer 1036. In some cases, additional UV layers are used. In some cases, at least one component from the second UV layer 1036 overlaps at least one other component from the first UV layer 1034.

Payment card 1002 can include at least one security feature 1026. The security feature 1026 can be an element that is intentionally difficult to reproduce. For example, holographs, microprinting, and the like can be used as suitable security features 1026. In some cases, the security feature 1026 can be UV-reactive, such as a strip of UV-reactive material or a UV-reactive logo. The security feature 1026 can be separate and distinct from the at least one hidden feature 1046. For example, the security feature 1026 can be an element that is identical across multiple payment cards (e.g., a UV-reactive security logo), whereas the at least one hidden feature 1046 can be customized for each payment card (e.g., a customizable message or graphic).

Payment card 1002 can include at least one integrated light source 1042. The integrated light source 1042 can be a UV light source capable of outputting UV light. In some cases, the integrated light source 1042 outputs mostly UV light and/or only light that is at or around UV wavelengths. The integrated light source 1042 can be an LED or other suitable light source. In some cases, the payment card 1002 can include a power source coupled to the integrated light source 1042 to supply power to the integrated light source 1042. In some cases, the payment card 1002 can include additional circuitry, conductors, and/or electrical contacts for conveying electrical current from a component of the payment card (e.g., contact circuit 1008 or contactless circuit 1048) or from an external source to the integrated light source 1042. In some cases, the payment card 1002 can include an induction coil capable of generating power in response to a nearby magnetic induction power signal. In such cases, the induction coil can supply its generated power to the integrated light source 1042 to power the integrated light source 1042.

Figure 11:
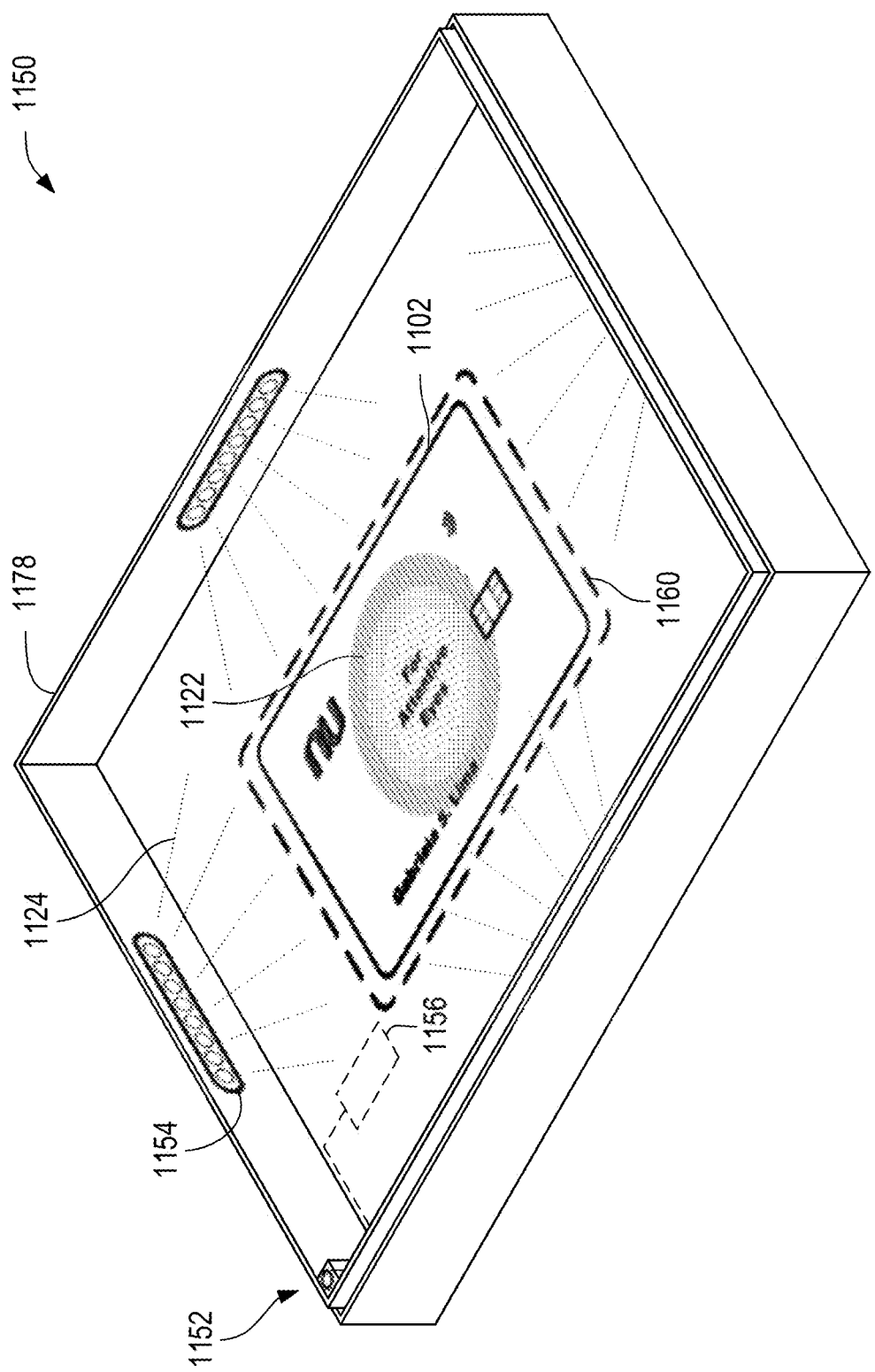
FIG. 11 is an isometric view of a payment card illuminated within a presentation container, according to certain aspects of the present disclosure.

FIG. 11 is an isometric view of a payment card 1102 illuminated within a presentation container 1150, according to certain aspects of the present disclosure. Payment card 1102 can be any suitable payment card, such as payment card 502 of FIG. 5. For illustrative purposes, presentation container 1150 is depicted in an open configuration, with its cover, or lid, removed from the remaining base 1178 of the presentation container 1150. While the cover is fully removable in the presentation container 1150 of FIG. 11, in some cases, a cover can be otherwise separable from the base 1178. For example, a cover can be coupled to the base 1178 via a hinge, allowing the cover to separate from the base 1178 via rotation about the hinge. Payment card 1102 is depicted within the payment card receiving space 1160 of the presentation container 1150.

Presentation container 1150 can include an integrated power supply 1156 coupled to a container detector 1152. The container detector 1152 can detect whether or not the presentation container 1150 is in an open configuration (e.g., whether or not the cover is removed). Once the container detector 1152 detects that the presentation container 1150 is in an open configuration, power can be supplied to one or more UV light sources 1154 positioned within the presentation container 1150, thus causing the generation of UV light 1124 directed towards the payment card receiving space 1160, and thus towards the payment card 1102. Upon being illuminated with the UV light 1124, the hidden features of the payment card 1102, such as graphic feature 1122, will be visible.

Container detector 1152 can be any suitable sensor for detecting whether or not the presentation container 1150 is in an open configuration. Examples of suitable detectors include pressure switches (e.g., detecting removal of the cover by the release of the switch), magnetic switches (e.g., detecting removal of the cover by separation of the magnetic switch from a magnet in the cover), light sensors (e.g., detecting removal of the cover by an increase in ambient light values), microphones (e.g., detecting removal of the cover by a change in ambient sound), or the like. As used herein, the term container detector 1152 can further include any circuitry or processors necessary to implement the detecting functions of the container detector 1152.

A presentation container 1150 can provide an engaging unboxing experience for an end user, allowing the user to initially see the hidden features when the presentation container 1150 is opened. In some cases, circuitry in the presentation container 1150 can implement delays or patterns in the activation of the UV light sources 1154. For example, the UV light source 1154 can be activated after a 10 second delay, to permit the user a small period of time to view the payment card 1102 before the hidden features are revealed. In another example, the UV light source 1154 can be repeatedly turned on and off at a suitable rate (e.g., one cycle per 5-15 seconds) to permit the user to view the payment card 1102 both with and without the hidden features revealed, prior to removing the payment card 1102 from the payment card receiving space 1160.

In some cases, detectors other than a container detector 1152 can be used to activate the UV light sources 1154. For example, a card detector can be used to detect the presence of the payment card 1102, such as to turn on the UV light sources 1154 when the payment card 1102 is in or near the payment card receiving space 1160. In another example, a user interface can be used instead of or in addition to the container detector 1152 to enable the user to control activation of the UV light sources 1154. For example, the user interface can be a button that can be depressed to turn on the UV light sources 1154 or a capacitive sensor to detect proximity of the user's hand (e.g., to turn on the UV light sources 1154 as the user's hand approaches the payment card receiving space 1160).

Figure 12:
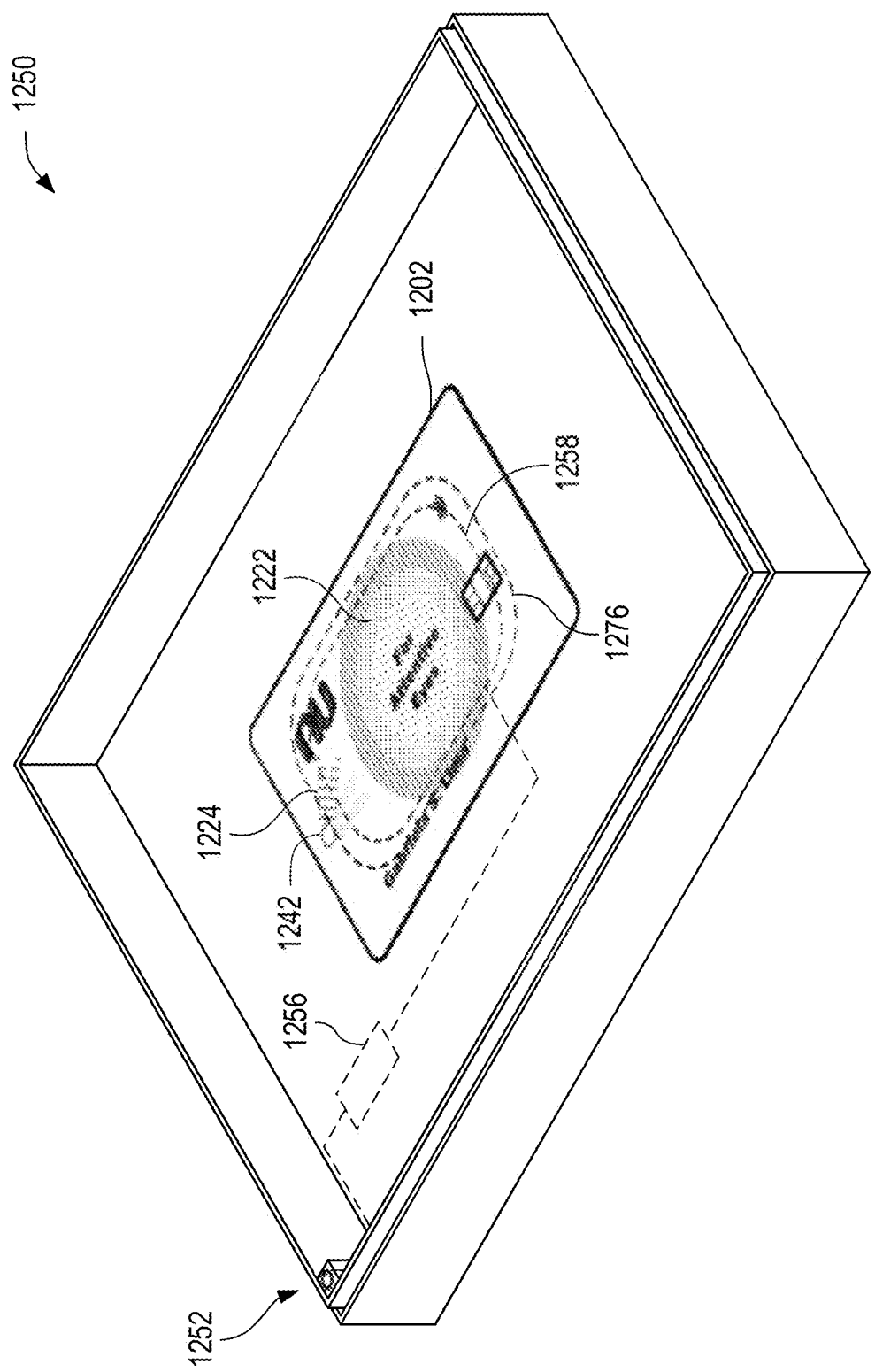
FIG. 12 is an isometric view of a payment card self-illuminated within a presentation container, according to certain aspects of the present disclosure.

FIG. 12 is an isometric view of a payment card 1202 self-illuminated within a presentation container 1250, according to certain aspects of the present disclosure. Payment card 1202 can be any suitable payment card, such as payment card 802 of FIG. 8. For illustrative purposes, presentation container 1250 is depicted in an open configuration, with its cover, or lid, removed.

Presentation container 1250 can include an integrated power supply 1256 coupled to a container detector 1252. The container detector 1252 can detect whether or not the presentation container 1250 is in an open configuration (e.g., whether or not the cover is removed). Once the container detector 1252 detects that the presentation container 1250 is in an open configuration, power can be supplied to transmitter 1258. Transmitter 1258 can be any suitable power transmitter, such as an RF antenna or a magnetic induction coil. Power supplied to transmitter 1258 can induce a current in a corresponding receiver 1276 of payment card 1202.

When current is induced in the receiver 1276, the current can cause an integrated light source 1242 in the payment card 1202 to illuminate, thus generating UV light 1224. Upon being illuminated with the UV light 1224, the hidden features of the payment card 1202, such as graphic feature 1222, will be visible.

In some cases, instead of transmitter 1258 supplying the energy used to power the integrated light source 1242, transmitter 1258 can output a signal that causes the payment card 1202 to use its own integrated power source to power the light source 1242.

While depicted as using a transmitter 1258 and corresponding receiver 1276 to provide current from the presentation container 1250 to the integrated light source 1242 of the payment card 1202, other techniques can be used. For example, electrical contacts on a surface of the presentation container 1250 can align with corresponding electrical contacts on a surface of the payment card 1202, thus permitting the container detector 1252 to cause power to be directed from the power source 1256 to the integrated light source 1242.

Figure 13:
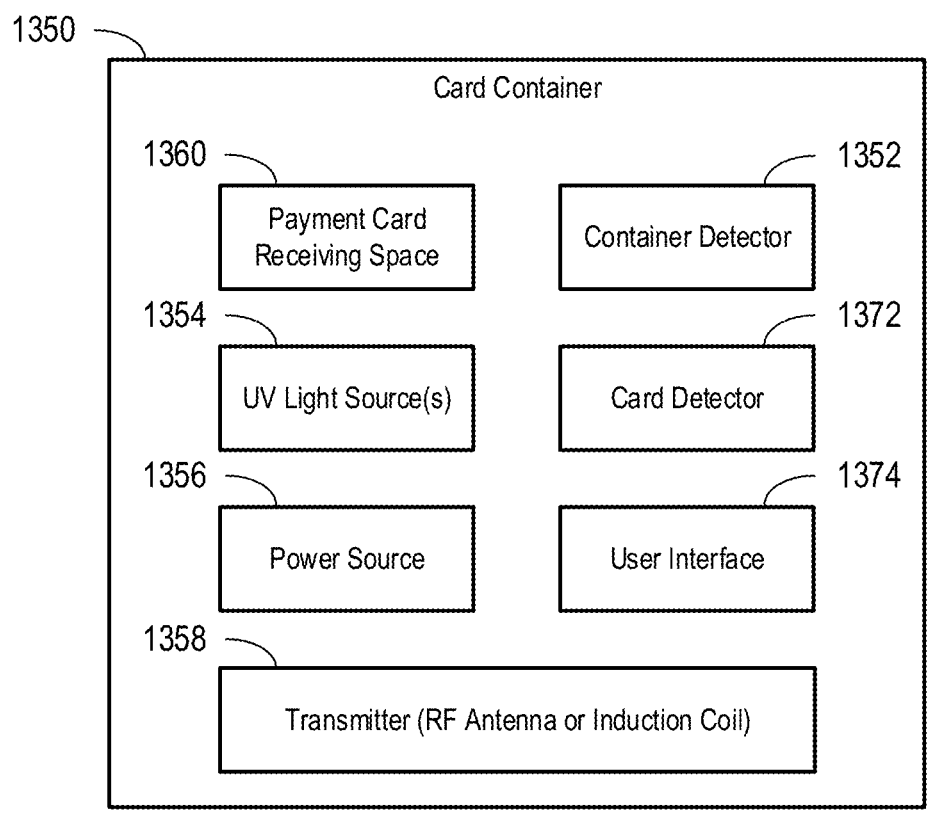
FIG. 13 is a schematic diagram of a card container, according to certain aspects of the present disclosure.

FIG. 13 is a schematic diagram of a card container 1350, according to certain aspects of the present disclosure. Card container 1350 can be any suitable card container, such as presentation container 1150 of FIG. 11. Card container 1350 is depicted with various components, although in some cases, card container 1350 can be implemented with fewer and/or additional components. Card container 1350 can take any suitable form, such as a presentation box (e.g., presentation container 1150 of FIG. 11), a wallet, an envelope, or other suitable container.

Card container 1350 can include a payment card receiving space 1360. The payment card receiving space 1360 can be a dedicated space for receiving the payment card (e.g., payment card 102 of FIG. 1). In some cases, the payment card receiving space 1360 includes one or more mechanical features (e.g., mechanical tabs, adhesive layers, or the like) to secure the payment card in place so that it remains in a suitable position for illumination by the one or more UV light sources 1354.

Card container 1350 can include at least one UV light source 1354. The at least one UV light source 1354 can be any suitable light source, such as an LED. The at least one UV light source 1354 can be positioned on walls of the card container 1350 or otherwise positioned to direct light towards the payment card receiving space 1360. In some cases, one or more light pipes, mirrors, or lenses can be used to direct light towards the payment card receiving space 1360 and/or alter the quality of the light being directed towards the payment card receiving space 1360 (e.g., to reduce or remove non-UV wavelengths or to diffuse the light).

Card container 1350 can include a power source 1356. The power source 1356 can be any suitable power source, such as a battery or capacitor. In some cases, power source 1356 can be removable and replaceable, although that need not be the place. In some cases, power source 1356 can include a charge receiver for charging the power source 1356. The charge receiver can take the form of electrical contacts (e.g., surface contacts or electrical contacts within a plug) or a wireless power receiver (e.g., induction coil). Thus, the power source 1356 of the card container 1350 can be easily recharged. Recharging can be useful, such as being able to charge a presentation box before it is shipped to an end user, or being able to recharge a wallet when it is not in use.

Card container 1350 can include a transmitter 1358. Transmitter 1358 can transmit a signal, such as a power signal and/or a data signal. In an example, transmitter 1358 can be an RF antenna capable of generating an RF signal that is itself capable of inducing a current in a receiving antenna of a nearby payment card. In another example, transmitter 1358 can be a magnetic induction coil capable of generating a changing magnetic field that is itself capable of inducing a current in a receiving coil of a nearby payment card. The transmitter 1358 can be used to remotely cause UV light to be generated by an integrated light source of a nearby payment card. In some cases, transmitter 1358 supplies the energy used to illuminate the integrated light source of the payment card. In other cases, transmitter 1358 can transmit a data signal that, when received by the payment card, causes the payment card to direct energy from its own power source to its integrated light source.

Card container 1350 can include a container detector 1352. The container detector 1352 can be any suitable sensor for detecting a state of the card container 1350, such as whether or not the card container 1350 is in an open configuration. In some cases, multiple container detectors 1352 can be used. In some cases, container detector 1352 can be integrated into a base of the card container 1350 and used to detect separation of a cover from the base. Separation of a cover form the base can include full removal of the cover (e.g., as a lid of a traditional shoebox is removed) or partial separation (e.g., as a lid of a traditional chest or traditional breadbox). The signal from the container detector 1352 can be used to activate and/or lockout (e.g., prevent activation of) the generation of UV light (e.g., via the one or more UV light sources 1354 of the card container 1350 or via an integrated light source of the payment card).

Card container 1350 can include a card detector 1372. Card detector 1372 can be any suitable sensor for detecting the presence and/or proximity of the payment card. In some cases, transmitter 1358 can function as card detector 1372. Examples of other suitable card detectors 1372 include pressure sensors, magnetic sensors, light sensors, and the like. The signal from the card detector 1372 can be used to activate and/or lockout (e.g., prevent activation of) the generation of UV light (e.g., via the one or more UV light sources 1354 of the card container 1350 or via an integrated light source of the payment card).

Card container 1350 can include a user interface 1374. Any suitable user interface 1374 can be used. Examples of suitable user interfaces include mechanical buttons (e.g., depress a button to active UV light), mechanical switches (e.g., switch UV light on and off), touchscreens (e.g., control UV light generation via a graphical user interface), conductance sensors (e.g., control UV light generation by moving one's hand closer to or further from the user interface 1374), or any other user-manipulatable sensor. The signal from the user interface 1374 can be used to activate and/or lockout (e.g., prevent activation of) the generation of UV light (e.g., via the one or more UV light sources 1354 of the card container 1350 or via an integrated light source of the payment card).

As used herein, each component of the card container 1350 can further include additional circuitry, processors, and/or other elements necessary to implement that component's functions as disclosed herein.

Figure 14:
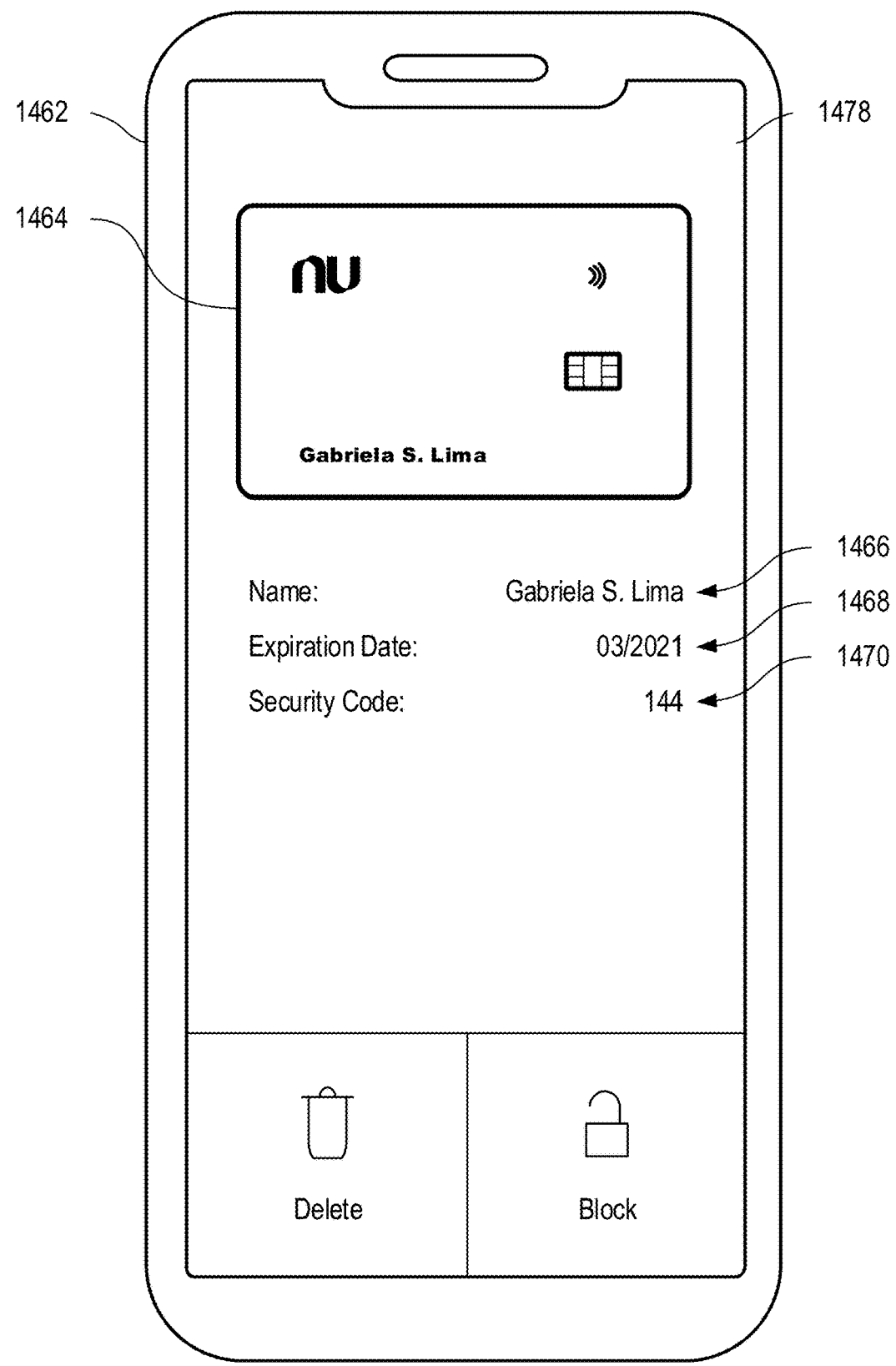
FIG. 14 is a front view of a graphical user interface for using a digital payment card, according to certain aspects of the present disclosure.

FIG. 14 is a front view of a graphical user interface 1478 for using a digital payment card, according to certain aspects of the present disclosure. The graphical user interface 1478 can be displayed on a user device 1462, such as a smartphone. Other types of user devices 1462 can be used. The graphical user interface 1478 can be implemented by an app. As used herein, the term "app" is intended to include mobile applications, applications executable on desktop or laptop computers, applications executable on servers, programs executable on wearable devices, or any other suitable software.

When initially set up, the app can receive authentication information from the user via a user interface (e.g., touchscreen buttons). The app can transmit that authentication information to an external server that authenticates the app running on the user device 1462. The authentication information can contain a user identifier and any other necessary authentication information, such as a password. The external server can respond by transmitting responsive authentication information to the app. The app can use this responsive authentication information to establish the digital payment card on the app. As part of the responsive authentication information, the app can receive information suitable to generate a digital representation 1464 of the physical payment card that is associated with the user's account.

The physical payment card associated with the digital representation 1464 in FIG. 14 can be payment card 102 or payment card 302 of FIGS. 1 and 3, respectively. The digital representation 1464 can present the various conspicuous features of the physical payment card as digital representations of the conspicuous features. In some cases, the digital representation 1464 looks, in appearance, the same as or similar to the physical payment card, although that need not always be the case. The digital representation 1464, in a normal state, does not display the hidden features of the physical payment card.

The graphical user interface 1478 can include additional information associated with the user's account or user ID, such as name information 1466, expiration information 1468, and additional security information 1470.

The user can initiate a transaction with the digital payment card in any suitable fashion, such as by moving the user device 1462 into close proximity with a contactless reader (e.g., a "tap-to-pay" reader), or by initiating a transaction in this or another app on the user device 1462 and authenticating use of the digital payment card for the transaction (e.g., using the digital payment card to provide the account information necessary for the transaction over a network connection, such as the Internet).

An activation signal can be provided to the app in various fashions, such as via user interaction with the user device 1462 (e.g., the user shaking the smartphone, tapping a button on the graphical user interface 1478, or long-pressing on the digital representation 1464 of the physical payment card); receipt of a transaction-related signal associated with a transaction initiated by the user device 1462; receipt of a transaction confirmation associated with a transaction initiated by the physical payment card; or the like. Upon receipt of the activation signal, the app can present one or more hidden feature representations associated with the hidden features of the physical payment card.

Figure 15:
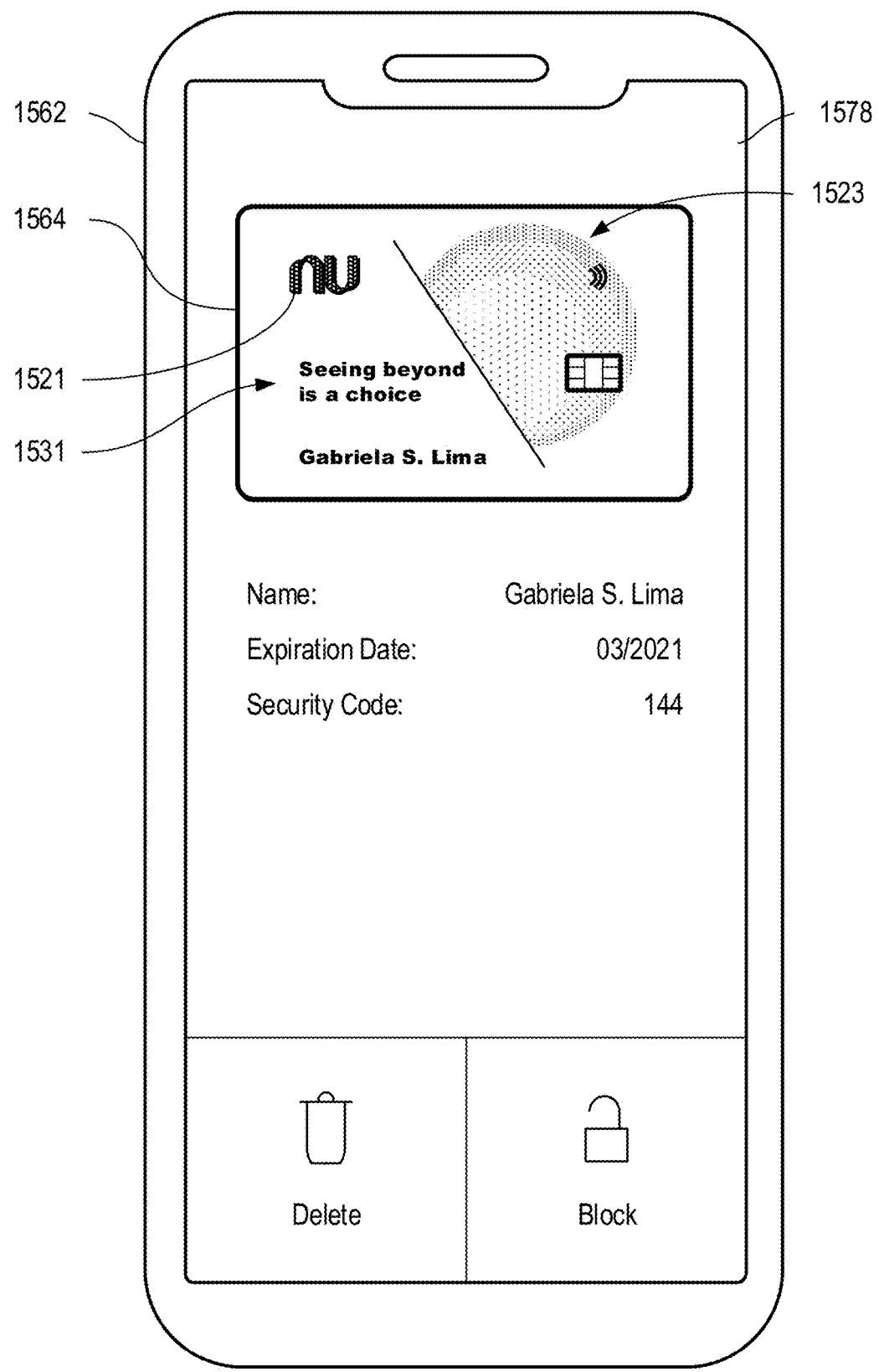
FIG. 15 is a front view of a graphical user interface for using a digital payment card depicting a hidden feature, according to certain aspects of the present disclosure.

FIG. 15 is a front view of a graphical user interface for using a digital payment card depicting a hidden feature, according to certain aspects of the present disclosure. The graphical user interface 1578 can be displayed on a user device 1562, such as a smartphone. Other types of user devices 1462 can be used. The graphical user interface 1478 can be implemented by an app or other piece of software. Graphical user interface 1578 and user device 1562 can be graphical user interface 1478 and user device 1462 from FIG. 14 after the app has received an activation signal.

Upon receipt of an activation signal, the app can present hidden feature representations that are associated with the hidden features of the physical payment card. In an example, digital representation 1564 is a digital representation of the physical payment card 302 of FIG. 3. In this example, payment card 302 of FIG. 3 includes a logo emphasis feature 320, a hidden message 330 and a graphic feature 322 that are all hidden features. When the activation signal is received by the app, the app can direct the user device 1562 to display, on the graphical user interface 1578, a corresponding logo emphasis feature representation 1521, a corresponding hidden message representation 331, and a corresponding graphic feature representation 323.

In some cases, a hidden feature representation can be designed to appear the same or closely similar to how the corresponding hidden feature of the physical payment card appears. In some cases, however, the hidden feature representation can be a representation that complements the corresponding hidden feature of the physical payment card. A complementary representation is a representation that is related to the corresponding hidden feature of the physical payment card, but may be slightly different or may presented in a different fashion. For example, presenting a complementary representation of a hidden message may include presenting the text of the message via a text-to-speech interpreter such that the text of the hidden message is read out loud by the user device 1562. In another example, presenting a complementary representation of a hidden message may include presenting an altered version of the text of the message over the digital representation 1564 of the card (e.g., presenting "A magical digital card" as the complementary representation associated with the hidden message "A magical card" on the physical payment card). In another example, presenting a complementary representation of a hidden message may include presenting the hidden message in a different location or different manner, such as presenting a hidden message representation 1531 as a separate pop-up window distinct from the digital representation 1564 of the physical payment card.

Figure 16:
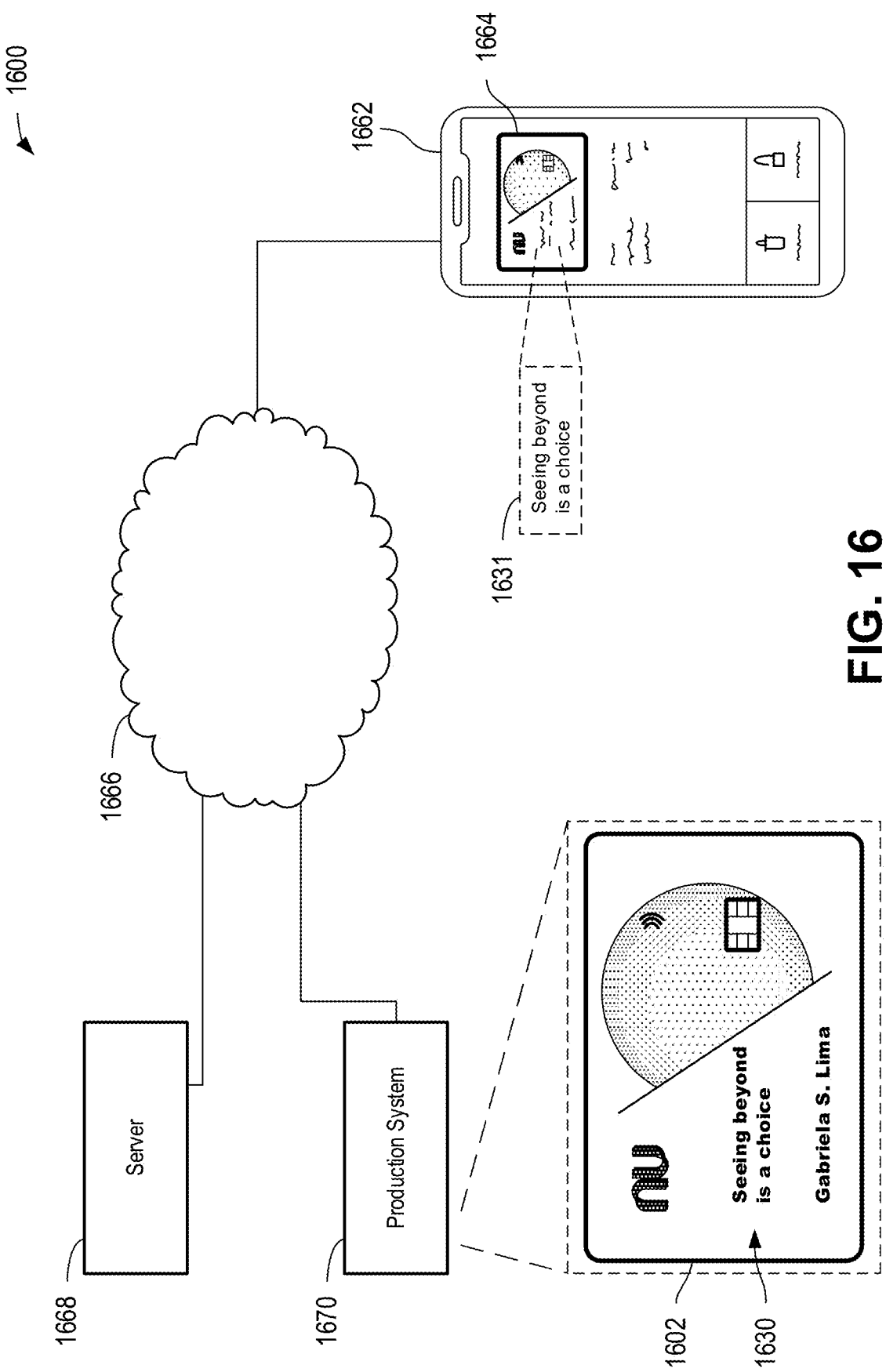
FIG. 16 is a schematic diagram depicting a computing environment for assigning hidden features of a payment card to a physical card and a digital card, according to certain aspects of the present disclosures.

FIG. 16 is a schematic diagram depicting a computing environment 1600 for assigning hidden features of a payment card to a physical card 1602 and a digital card 1664, according to certain aspects of the present disclosures. Physical card 1602 can be payment card 102 or payment card 302 of FIGS. 1 and 3, respectively.

The computing environment 1600 can include a user device 1662 for storing the digital card 1664. User device 1662 can be user device 1462 of FIG. 14. The user device 1662 can be a smartphone, tablet, smartwatch, computer, wearable device, or other suitable device. The user device 1662 can include a display. Each user device 1662 can have a unique user device identifier (e.g., a unique hardware identifier, such as a mac address, serial number, or International Mobile Equipment Identity number; or a software identifier, such as a customized globally unique ID or an account number).

The computing environment 1600 can include a sever 1668 for handling back-end functionality as disclosed herein. For example, the server 1668 can assist with managing each user's accounts, authenticating transactions and generating transaction confirmations, storing hidden feature information, and/or storing other information associated with a user's payment card. Server 1668 can be a single computing device or can be implemented across multiple computing devices located in the same or different locations. In some cases, some aspects of server 1668 are implemented as computing devices of production system 1670.

Production system 1670 can include one or more computing devices (e.g., computers) and other equipment usable to manufacture a physical payment card 160. Specifically, production system 1670 includes at least a computing device for determining one or more hidden features to use on a given physical payment card 160 and appropriate additional equipment (e.g., printing equipment, curing equipment, and laminating equipment) necessary to impart the hidden feature onto the physical payment card 160 during manufacture.

The server 1668, production system 1670, and user device 1662 can be interconnected via one or more networks 1666. The one or more networks 1666 can include a local area network, a wide area network, a virtual private network, a cloud, the Internet, or the like. For example, production system 1670 can be connected to server 1668 via one or more networks 1666 such that the production system 1670 is able to receive and/or transmit information associated hidden feature information. In another example, user device 1662 can be connected to server 1668 via one or more networks 1666 such that the user device 1662 can receive information usable to generate the digital payment card 1664, display the hidden feature representations, and receive transaction confirmations.

When a physical payment card 1602 is initially created, the production system 1670 can determine what hidden feature(s) to use on the card, then manufacture the card with those feature(s). For example, the production system can determine that hidden message 1630 should be used. Determination of the hidden feature(s) to be used is described in further detail herein. In some cases, the production system 1670 can include one or more UV light sources and an imager to obtain image data associated with the physical payment card under UV illumination. The obtained image data can be compared with the selected hidden message 1630 to ensure the appropriate hidden message 1630 is imparted on the physical payment card 1602. In some cases, the image data can be analyzed to identify the actual hidden feature applied to the card and one or more conspicuous features of the card (e.g., a cardholder name). This identified actual hidden feature and identified conspicuous feature(s) can be cross-referenced with a database of desired hidden features for given users to ensure that the given hidden feature was applied to the correct user's card, and not accidentally applied to another user's card instead.

The production system 1670 can store information about the hidden feature that was applied to physical payment card 1602 internally or on server 1668. This information can be later retrieved when a future physical payment card is being manufactured for that user or when that user is setting up a digital payment card 1664 on a user device 1662. When the user is setting up a digital payment card 1664, user device 1662 can communicate with server 1668 to receive the hidden feature(s) associated with that user's physical payment card. For example, user device 1662 can transmit a user ID to server 1668. The server 1668 can respond by providing information usable to establish the digital payment card 1664 on the user device 1662, including information about what hidden feature(s) are present on the physical payment card 1602 (e.g., information about what hidden feature representation(s) are to be used on the digital payment card 1664). This information can then be leveraged by the user device 1662 to permit display of a hidden feature representation that corresponds to a hidden feature of the physical payment card. For example, digital payment card 1664 can display a hidden message representation 1631 that is the same as or substantially similar to the hidden message 1630 of the physical payment card 1602.

In some cases, computing environment 1600 can include additional and/or fewer components, set up in the same or different configurations. For example, in some cases, production system 1670 is directly connected to server 1668 rather than being connected via one or more networks 1666.

Figure 17:
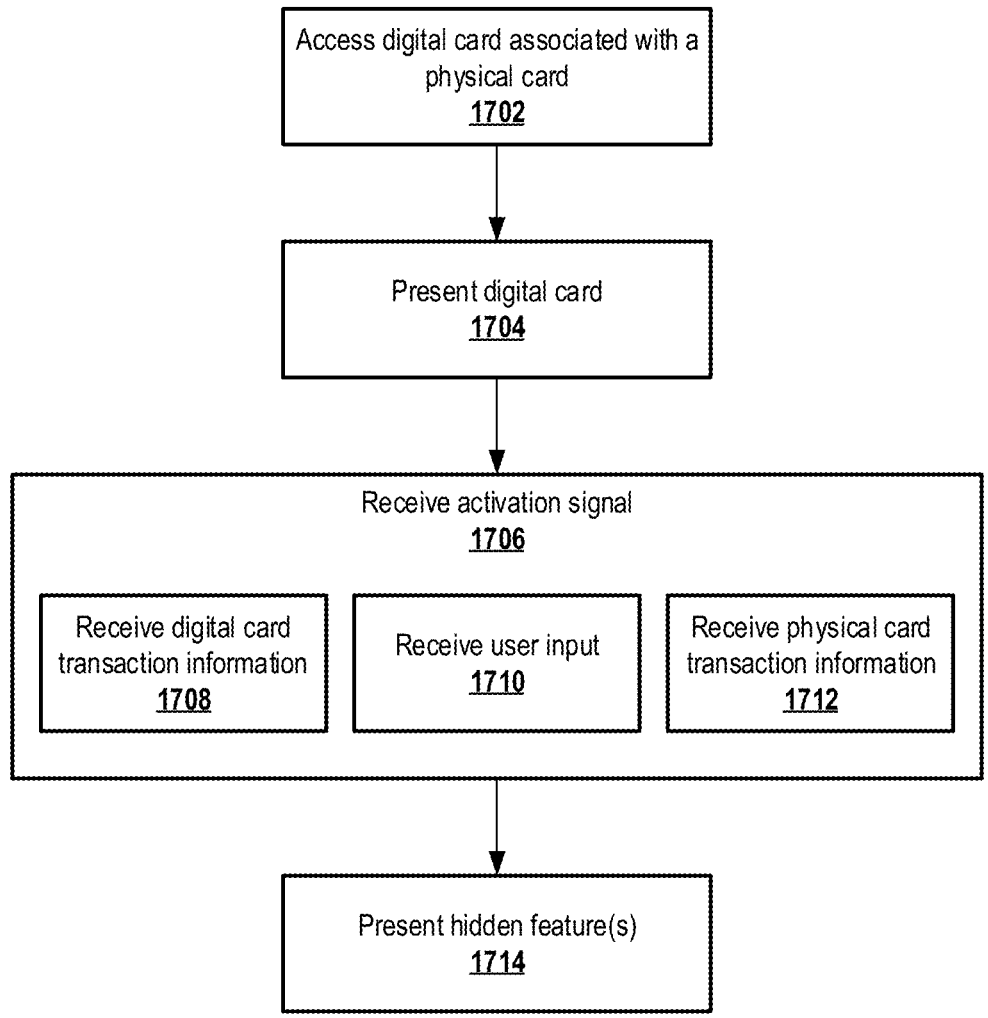
FIG. 17 is a flowchart depicting a process of using a digital card with hidden features, according to certain aspects of the present disclosure.

FIG. 17 is a flowchart depicting a process 1700 of using a digital card with hidden features, according to certain aspects of the present disclosure. Process 1700 can be performed on any suitable user device, such as user device 1462 of FIG. 14. The digital card can be associated with a user's account, and thus with a user ID and the user's physical payment card. The physical payment card can be any suitable payment card, such as payment card 102 of FIG. 1. The digital card can be any suitable digital card, such as digital card 1464 of FIG. 14.

At block 1702, a digital card associated with a physical card is accessed. The digital card can be accessed by opening an appropriate app on a user device (e.g., a smartphone or smartwatch). Accessing the digital card at block can include authenticating the user with the user device, such as by typing in a password or providing a biometric identifier (e.g., via fingerprint, facial recognition, voiceprint, or the like).

In response to accessing the digital card at block 1702, the user device can present the digital card at block 1704. Presenting the digital card can include displaying a representation of the digital card on a display of the user device, or otherwise presenting a representation of the digital card. For example, a displayless portable user device can be used, in which case presenting the digital card may include generating a perceptible stimulus (e.g., a discernable vibration pattern, an illuminated LED, a discernable sound) indicative that the digital card is selected.

At block 1706, the user device can receive an activation signal. Any suitable activation signal can be used, and the activation signal can be received from the user device itself (e.g., via one or more sensors or user inputs of the user device) or from an external source (e.g., via a network connection).

In some cases, receiving the activation signal at block 1706 includes receiving digital card transaction information at block 1708. The digital card transaction information can be in response to initiating a digital card transaction using the user device. Receiving digital card transaction information at block 1708 can include one or more of i) receiving a confirmation that digital card information has been presented to initiate a transaction; ii) receiving a confirmation that the digital card information has been received by a receiving device (e.g., a tap-to-pay receiver); iii) receiving a confirmation that the transaction information has been submitted to a transaction-authenticating authority (e.g., a card issuer or account issuer); or iv) receiving confirmation that the transaction has been completed successfully.

In some cases, receiving the activation signal at block 1706 includes receiving user input at block 1710. User input can be received via any sensor or input device coupled to the user device. Examples of suitable user input include tapping physical or digital button, shaking the user device, tapping the user device, covering a light sensor of the user device, interacting with a facial recognition sensor (e.g., smiling at the user device), interacting with the digital representation of the physical payment card (e.g., swiping or tapping on the digital representation), or the like.

In some cases, receiving the activation signal at block 1706 includes receiving physical card transaction information at block 1712. The physical card transaction information can be in response to initiating a transaction using the physical payment card. Receiving physical card transaction information at block 1712 can include one or more of i) receiving a confirmation that the physical card was swiped, tapped, inserted, or otherwise used to initiate a transaction; ii) receiving a confirmation that the physical card information has been received by a receiving device (e.g., a tap-to-pay receiver or magnetic strip reader); iii) receiving a confirmation that the transaction information has been submitted to a transaction-authenticating authority (e.g., a card issuer or account issuer); or iv) receiving confirmation that the transaction has been completed successfully. For example, upon successfully completing a transaction with a physical payment card, a server of the card issuer can push or otherwise provide a confirmation signal to the user device, which can be used as the activation signal.

In response to receiving the activation signal at block 1706, the user device can present the hidden feature(s) at block 1714. Presenting the hidden feature(s) at block 1714 can include presenting, by the user device, a hidden feature representation for one, some, or all of the hidden features present on the physical payment card. In some cases, presenting a hidden feature includes displaying the hidden feature representation on a representation of the physical payment card such that the hidden feature representation on the representation of the physical payment card appears to be the same as and in the same relative location as the hidden feature on the physical payment card. In some cases, presenting a hidden feature includes displaying the hidden feature representation in a separate window or separately from the representation of the physical payment card. In some cases, presenting the hidden feature includes presenting the hidden feature as a discernable non-visual stimulus (e.g., a pattern of vibrations, a text-to-speech interpretation, a preset sound effect, or the like) that is associated with the hidden feature.

In some cases, presenting a hidden feature at block 1714 includes presenting a complementary feature that is associated with the hidden feature of the physical payment card. The complementary feature can be selected or designed to complement (e.g., enhance, fit within, appear similar to, appear exactly opposite to, mirror, and the like) the hidden feature.

Process 1700 is depicted with reference to various blocks, however in some cases, process 1700 can include additional and/or fewer blocks, in the same or a different order.

Figure 18:
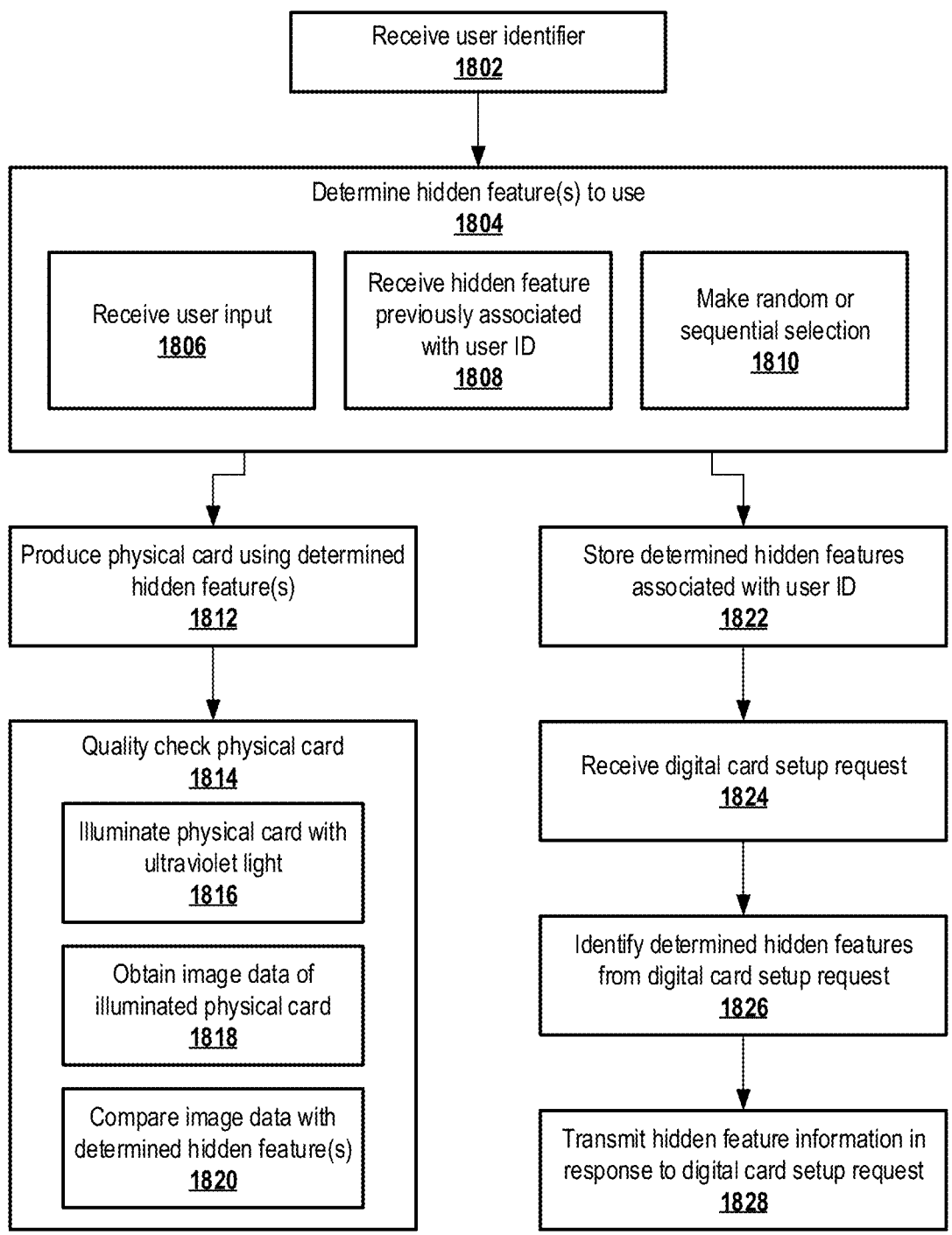
FIG. 18 is a flowchart depicting a process for assigning hidden features of a payment card to a physical card and a digital card, according to certain aspects of the present disclosures.

FIG. 18 is a flowchart depicting a process 1800 for assigning hidden features of a payment card to a physical card and a digital card, according to certain aspects of the present disclosures. Process 1800 can be performed using any suitable computing device, such as production system 1670 and/or server 1668 of FIG. 16. The physical card can be any suitable payment card, such as payment card 102 of FIG. 1. The digital card can be any suitable digital card, such as digital card 1464 of FIG. 14.

At block 1802, a user identifier is received. The user identifier can be an account number, a username, or any other unique identifier associated with a user or the user's account. In some cases, the user identifier is received via a network connection, although that need not always be the case.

At block 1804, the one or more hidden feature(s) to be used can be determined. Determining a hidden feature to use can include generating or selecting a hidden feature, such as from a list of available or potential hidden features.

In some cases, determining a hidden feature to use at block 1804 can include receiving a user input at block 1806. Receiving the user input can include receiving a user selection of one or more hidden features to use on the card, such as a user-designed feature and/or a selection of preset available hidden features. In some cases, receiving the user input at block 1806 can include receiving user information (e.g., demographic information, account information, or the like) and generating or selecting one or more hidden features based on that received user information. For example, in some cases, a hidden feature can be based on the user's name, such as using the first initial of each of the user's names to create a hidden feature that is akin to a monogram.

In some cases, determining a hidden feature to use at block 1804 includes receiving a hidden feature previously associated with the user ID at block 1808. In such cases, the user ID received at block 1802 can be applied to a database to identify one or more historical hidden features that were previously used on one or more of the user's past payment cards. For example, a historical hidden feature can be a feature that is present on the user's current payment card or was present on an earlier payment card of the user.

The historical hidden feature information received at block 1808 can be used to determine what hidden feature(s) to use in several fashions. In a first example, one or more of the historical hidden features can be selected to be reused as one or more hidden features for the new payment card. This example can be especially useful when a user is replacing a payment card still in their possession and is desirous of keeping the same hidden features. In another example, one or more of the historical hidden features can be used to ensure the one or more hidden features for the new payment card do not reuse any of the one or more historical hidden features. In such cases, the one or more historical hidden features can be used to exclude certain matching hidden features from a list of potential hidden features. This example can be especially useful when a user is replacing a payment card that is no longer in their possession, ensuring the new payment card includes different hidden features than the old payment card.

In some cases, determining a hidden feature to use at block 1804 includes making a random or sequential selection at block 1810. Each hidden feature can be selected from a set of potential hidden features. In some cases, the set of potential hidden features can be itself selected or modified based on user information or account information. For example, the potential hidden features available to a higher tier account may be different than those available to a lower tier account. In another example, the potential hidden features available to a user living in a first location (e.g., a first country) may be different than those available to a user living in a second location (e.g., a second country). In another example, the potential hidden features available to a user using a first language may be different than those of a user using a second language.

Making a random selection can include randomly or pseudo-randomly selecting one or more hidden features from the set of potential hidden features.

Making a sequential selection can include sequentially selecting one or more hidden features from the set of potential hidden features. In some cases, sequentially selecting one or more hidden features can be on an account-by-account basis, in which case a next hidden feature in the set of potential hidden features will be used the next time a payment card is created for the same user or account. In some cases, sequentially selecting one or more hidden features can be based on a card-by-card basis, in which case the hidden feature being used will advance to the next hidden feature in the set of potential hidden features with every new payment card, regardless of user or account. In some cases, sequentially selecting one or more hidden features can be on a batch-by-batch basis, in which case the hidden feature being used will advance to the next hidden feature in the set of potential hidden features with every new batch of two or more payment cards, regardless of user or account.

After the one or more hidden features to be used is determined at block 1804, the physical card can be produced using the determined hidden feature(s) at block 1812. Producing the physical card at block 1812 can include, among other steps, applying UV-reactive material (e.g., UV-reactive ink) to one or more UV layers and laminating the layers together to form the payment card.

In some cases, a quality check of the physical card can be performed at block 1814. Performing the quality check can include illuminating the physical card with UV light at block 1816, obtaining image data of the illuminated physical card at block 1818, then comparing the image data with the determined hidden feature(s) from block 1804 at block 1820. In some cases, comparing the image data at block 1820 can include extracting one or more detected hidden features form the image data. The one or more detected hidden features can be compared with the determined hidden features from block 1804 to ensure the physical card was manufactured appropriately. In some cases, comparing the image data at block 1820 can further include extracting one or more conspicuous features from the image data. The one or more conspicuous features from a given physical card can be used to identify what hidden features are intended to be present on that physical card, which can then be compared with the detected hidden features to ensure the physical card was manufactured appropriately.

Failure of the quality check at block 1814 can automatically cause the physical card to i) be held or be redirected for manual inspection; ii) be destroyed; and/or iii) be re-manufactured in a new instance of block 1812.

In some cases, after determining the one or more hidden features to be used at block 1804, the determined one or more hidden features can be stored at block 1822. Storing the hidden feature(s) at block 1822 can include storing the hidden feature(s) in association with the user ID from block 1802. In some cases, the hidden feature(s) can be stored in memory of a production system (e.g., production system 1670 of FIG. 16) or memory of a server (e.g., server 1668 of FIG. 16).

In some cases, a digital card setup request can be received at block 1824. The digital card setup request can be received from a user device, and can include the user ID or another identifier usable to identify the user ID. Thus, the digital card setup request can be considered to identify a supplied user ID.

In response to receiving the digital card setup request at block 1824, one or more hidden features that are associated with the supplied user ID (e.g., one or more hidden features used on the most recent payment card to be manufactured in association with the supplied user ID) can be determined. For example, the hidden feature(s) at block 1826 can match the hidden feature(s) incorporated on the physical card when the physical card is produced at block 1812 when the supplied user ID from the received digital card setup request at block 1824 matches the user ID received at block 1802.

At block 1828, hidden feature information can be transmitted in response to the digital card setup request from block 1824. For example, if a digital card setup request is received from a user device, the hidden feature information can be transmitted to the same user device, permitting the same user device to make use of the hidden feature information to present hidden features, as disclosed herein. The hidden feature information can include information usable to generate hidden feature representations on or in association with a digital representation of the physical payment card (e.g., the physical payment card produced at block 1812).

Process 1800 is depicted with reference to various blocks, however in some cases, process 1800 can include additional and/or fewer blocks, in the same or a different order. For example, in some cases process 1800 may not include blocks 1822, 1824, 1826, and 1828.

FIG. 19 is a block diagram of an example system architecture 1900 for implementing features and processes of the present disclosure, such as those presented with reference to processes 1700 and 1800 of FIGS. 17 and 18, respectively. The architecture 1900 can be used to implement a server, a user device, a computing device (e.g., server 1668 or user device 1662 of FIG. 16), or any other suitable device for performing some or all of the aspects of the present disclosure. The architecture 1900 can be implemented on any electronic device that runs software applications derived from compiled instructions, including without limitation personal computers, servers, smart phones, electronic tablets, game consoles, email devices, and the like. In some implementations, the architecture 1900 can include one or more processors 1902, one or more input devices 1904, one or more display devices 1906, one or more network interfaces 1908, and one or more computer-readable mediums 1910. Each of these components can be coupled by bus 1912.

Display device 1906 can be any known display technology, including but not limited to display devices using Liquid Crystal Display (LCD) or LED technology. Processor(s) 1902 can use any known processor technology, including but not limited to graphics processors and multi-core processors. Input device 1904 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 1912 can be any known internal or external bus technology, including but not limited to ISA, EISA, PCI, PCI Express, NuBus, USB, Serial ATA or FireWire.

Computer-readable medium 1910 can be any medium that participates in providing instructions to processor(s) 1902 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 1910 can include various instructions for implementing operating system 1914 and applications 1920 such as computer programs. The operating system can be multi-user, multiprocessing, multitasking, multithreading, real-time and the like. The operating system 1914 performs basic tasks, including but not limited to: recognizing input from input device 1904; sending output to display device 1906; keeping track of files and directories on computer-readable medium 1910; controlling peripheral devices (e.g., storage drives, interface devices, etc.) which can be controlled directly or through an I/O controller; and managing traffic on bus 1912. Computer-readable medium 1910 can include various instructions for implementing firmware processes, such as a BIOS. Computer-readable medium 1910 can include various instructions for implementing any of the processes described herein, including but not limited to, at least processes 1700 and 1800 of FIGS. 17 and 18, respectively.

Memory 1918 can include high-speed random access memory and/or non-volatile memory, such as one or more magnetic disk storage devices, one or more optical storage devices, and/or flash memory (e.g., NAND, NOR). The memory 1918 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 1918 can store an operating system, such as Darwin, RTXC, LINUX, UNIX, OS X, WINDOWS, or an embedded operating system such as VxWorks.

System controller 1922 can be a service processor that operates independently of processor 1902. In some implementations, system controller 1922 can be a baseboard management controller (BMC).

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

As used below, any reference to a series of examples is to be understood as a reference to each of those examples disjunctively (e.g., "Examples 1-4" is to be understood as "Examples 1, 2, 3, or 4").

Example 1 is a container, comprising: a payment card receiving space for receiving a payment card having one or more ultraviolet-reactive features; a power supply; one or more ultraviolet light sources; and a container detector positioned to identify when the container is in an open configuration, wherein the container detector causes the one or more ultraviolet light sources to illuminate in response to the container being in the open configuration.

Example 2 is the container of example(s) 1, further comprising: a base portion, wherein the payment card receiving space, the power supply, the ultraviolet light source, and the container detector are housed in the base portion; and a cover separable from the base portion, wherein the container is in the open configuration when the cover is separated from the base portion.

Example 3 is the container of example(s) 1 or 2, wherein the one or more ultraviolet light sources include at least one ultraviolet light source positioned at a wall of the container and directed towards the payment card receiving space.

Example 4 is the container of example(s) 1-3, wherein the one or more ultraviolet light sources includes at least one ultraviolet light source incorporated in the payment card Example 5 is the container of example(s) 4, further comprising a radiofrequency antenna coupled to the container detector to generate a radiofrequency signal when the container detector identifies that the container is in the open configuration, wherein the radiofrequency signal, when received by the payment card, induces the at least one ultraviolet light source incorporated in the payment card to illuminate.

Example 6 is the container of example(s) 1-5, further comprising a card detector for identifying when the payment card is in the payment card receiving space, wherein the card detector prohibits illumination of the one or more ultraviolet light sources when the payment card is not in the payment card receiving space.

Example 7 is the container of example(s) 1-6, wherein the payment card includes a plurality of ultraviolet-reactive layers, wherein each ultraviolet-reactive layer includes at least one of the one or more ultraviolet-reactive features.

Example 8 is the container of example(s) 1-7, wherein the one or more ultraviolet-reactive features include at least a first ultraviolet-reactive feature and a second ultraviolet-reactive feature, wherein a first opacity of the first ultraviolet-reactive feature is different from a second opacity of the second ultraviolet-reactive feature.

Example 9 is the container of example(s) 1-8, wherein the one or more ultraviolet-reactive features include a graphical feature.

Example 10 is the container of example(s) 1-9, wherein the payment card includes at least one conspicuous feature that is visible under visible light, wherein the one or more ultraviolet-reactive features include an emphasis feature associated with the conspicuous feature.

Example 11 is the container of example(s) 1-10, wherein the one or more ultraviolet-reactive features include a textual message.

Example 12 is the container of example(s) 1-11, wherein the payment card further includes one or more ultraviolet-reactive security features that are distinct from the one or more ultraviolet-reactive features.

Example 13 is the container of example(s) 1-12, wherein an interior of the container is accessible via an opening, wherein the container is in the open position when payment card is visible through the opening from an exterior of the container.

Example 14 is a method, comprising: providing a container having a payment card contained therein; opening the container; generating an ultraviolet light in response to opening the container, wherein generation of the ultraviolet light renders visible an ultraviolet-reactive feature of the payment card.

Example 15 is the method of example(s) 14, wherein the container includes a cover removable couplable to a base portion, wherein opening the container includes separating the cover from the base portion, and wherein generating the ultraviolet light in response to opening the container includes detecting separation of the cover from the base portion.

Example 16 is the method of example(s) 14 or 15, wherein generating the ultraviolet light includes supplying power to one or more ultraviolet light sources positioned at a wall of the container and directed towards the payment card.

Example 17 is the method of example(s) 14-16, wherein generating the ultraviolet light includes supplying a signal to the payment card to induce illumination of an ultraviolet light source incorporated in the payment card.

Example 18 is the method of example(s) 17, wherein supplying the signal to the payment card includes generating a radiofrequency signal at a radiofrequency antenna in the container.

Example 19 is the method of example(s) 14-18, further comprising detecting presence of the payment card within the container, wherein generating the ultraviolet light is prohibited until presence of the payment card within the container is detected.

Example 20 is the method of example(s) 14-19, wherein opening the container includes manipulating an opening of the container until the payment card is visible from outside the container.

Example 21 is a method, comprising: receiving a user identifier associated with a user having a payment account; determining one or more hidden features for use, wherein each of the one or more hidden features is visible when illuminated with ultraviolet light and undiscernible when illuminated with only visible light; and producing a physical payment card associated with the payment account, wherein producing the physical payment card includes incorporating the one or more hidden features into the physical payment card.

Example 22 is the method of example(s) 21, wherein determining the one or more hidden features for use includes i) receiving a user selection and identifying at least one of the one or more hidden features using the received user selection; ii) selecting at least one of the one or more hidden features in sequence; iii) selecting at least one of the one or more hidden features randomly; or iv) any combination of i-iii.

Example 23 is the method of example(s) 21 or 22, wherein determining the one or more hidden features for use includes: accessing a database of historical hidden feature assignments; identifying one or more historical hidden features associated with the user identifier; and identifying the one or more hidden features based on the one or more historical hidden features.

Example 24 is the method of example(s) 23, wherein identifying the one or more hidden features based on the one or more historical hidden features includes selecting the one or more historical hidden features as the one or more hidden features.

Example 25 is the method of example(s) 23, wherein identifying the one or more hidden features based on the one or more historical hidden features includes: accessing a list of potential hidden features; and selecting one or more potential hidden features as the one or more hidden features based on the one or more historical hidden features, wherein the selected one or more potential hidden features does not include any of the one or more historical hidden features.

Example 26 is the method of example(s) 21-25, further comprising illuminating the physical payment card with an ultraviolet light source; obtaining image data of the physical payment card while illuminated by the ultraviolet light source; and comparing the image data with the determined one or more hidden features.

Example 27 is the method of example(s) 21-25, further comprising: storing the determined one or more hidden features in association with the user identifier; receiving a digital card setup request including a received identifier; identifying the determined one or more hidden features by matching the received identifier with the user identifier; and transmitting the determined one or more hidden features in response to receiving the digital card setup request.

Example 28 is a system, comprising: one or more data processors; and a non-transitory computer-readable storage medium containing instructions which, when executed on the one or more data processors, cause the one or more data processors to perform operations including: receiving a user identifier associated with a user having a payment account; determining one or more hidden features for use, wherein each of the one or more hidden features is visible when illuminated with ultraviolet light and undiscernible when illuminated with only visible light; and producing a physical payment card associated with the payment account, wherein producing the physical payment card includes incorporating the one or more hidden features into the physical payment card.

Example 29 is the system of example(s) 28, wherein determining the one or more hidden features for use includes i) receiving a user selection and identifying at least one of the one or more hidden features using the received user selection; ii) selecting at least one of the one or more hidden features in sequence; iii) selecting at least one of the one or more hidden features randomly; or iv) any combination of i-iii.

Example 30 is the system of example(s) 28 or 29, wherein determining the one or more hidden features for use includes: accessing a database of historical hidden feature assignments; identifying one or more historical hidden features associated with the user identifier; and identifying the one or more hidden features based on the one or more historical hidden features.

Example 31 is the system of example(s) 30, wherein identifying the one or more hidden features based on the one or more historical hidden features includes selecting the one or more historical hidden features as the one or more hidden features.

Example 32 is the system of example(s) 30 or 31, wherein identifying the one or more hidden features based on the one or more historical hidden features includes: accessing a list of potential hidden features; and selecting one or more potential hidden features as the one or more hidden features based on the one or more historical hidden features, wherein the selected one or more potential hidden features does not include any of the one or more historical hidden features.

Example 33 is the system of example(s) 28-32, wherein the operations further include illuminating the physical payment card with an ultraviolet light source; obtaining image data of the physical payment card while illuminated by the ultraviolet light source; and comparing the image data with the determined one or more hidden features.

Example 34 is the system of example(s) 28-33, wherein the operations further include: storing the determined one or more hidden features in association with the user identifier; receiving a digital card setup request including a received identifier; identifying the determined one or more hidden features by matching the received identifier with the user identifier; and transmitting the determined one or more hidden features in response to receiving the digital card setup request.

Example 35 is a computer-program product tangibly embodied in a non-transitory machine-readable storage medium, including instructions configured to cause a data processing apparatus to perform operations including: receiving a user identifier associated with a user having a payment account; determining one or more hidden features for use, wherein each of the one or more hidden features is visible when illuminated with ultraviolet light and undiscernible when illuminated with only visible light; and producing a physical payment card associated with the payment account, wherein producing the physical payment card includes incorporating the one or more hidden features into the physical payment card.

Example 36 is the computer-program product of example(s) 35, wherein determining the one or more hidden features for use includes i) receiving a user selection and identifying at least one of the one or more hidden features using the received user selection; ii) selecting at least one of the one or more hidden features in sequence; iii) selecting at least one of the one or more hidden features randomly; or iv) any combination of i-iii.

Example 37 is the computer-program product of example(s) 35 or 36, wherein determining the one or more hidden features for use includes: accessing a database of historical hidden feature assignments; identifying one or more historical hidden features associated with the user identifier; and identifying the one or more hidden features based on the one or more historical hidden features.

Example 38 is the computer-program product of example(s) 37, wherein identifying the one or more hidden features based on the one or more historical hidden features includes i) selecting the one or more historical hidden features as the one or more hidden features; or ii) accessing a list of potential hidden features and selecting one or more potential hidden features as the one or more hidden features based on the one or more historical hidden features, wherein the selected one or more potential hidden features does not include any of the one or more historical hidden features.

Example 39 is the computer-program product of example(s) 37 or 38, wherein the operations further include illuminating the physical payment card with an ultraviolet light source; obtaining image data of the physical payment card while illuminated by the ultraviolet light source; and comparing the image data with the determined one or more hidden features.

Example 40 is the computer-program product of example(s) 35-39, wherein the operations further include: storing the determined one or more hidden features in association with the user identifier; receiving a digital card setup request including a received identifier; identifying the determined one or more hidden features by matching the received identifier with the user identifier; and transmitting the determined one or more hidden features in response to receiving the digital card setup request.

Example 41 is a method, comprising: accessing a digital card associated with a physical card, the physical card having i) one or more hidden features, wherein each of the one or more hidden features is visible when illuminated with ultraviolet light and undiscernible when illuminated with only visible light, and ii) one or more conspicuous features, wherein each of the one or more conspicuous features is visible when illuminated with only visible light; presenting, as the digital card, a representation of the physical card, wherein presenting the representation includes displaying the one or more conspicuous features without displaying the one or more hidden features; receiving an activation signal; and updating the representation of the physical card by displaying the one or more hidden features in response to receiving the activation signal.

Example 42 is the method of example(s) 41, wherein receiving the activation signal includes initiating a payment using the digital card.

Example 43 is the method of example(s) 42, wherein receiving the activation signal includes receiving confirmation of the payment.

Example 44 is the method of example(s) 41-43, wherein receiving the activation signal includes receiving a user input via an input device.

Example 45 is the method of example(s) 41-44, wherein receiving the activation signal includes receiving a transaction confirmation associated with a transaction performed by the physical card.

Example 46 is the method of example(s) 41-45, wherein receiving the activation signal includes detecting proximity of the physical card.

Example 47 is the method of example(s) 41-46, wherein the one or more hidden features includes: i) a graphical feature; ii) an emphasis feature associated with at least one of the one or more conspicuous features; iii) a textual message; iv) an upper ultraviolet-reactive feature incorporated into an upper ultraviolet layer of the physical card and a lower ultraviolet-reactive feature incorporated into a lower ultraviolet layer of the physical card, wherein the upper ultraviolet layer and lower ultraviolet layer are on a same face of the physical card; v) a first ultraviolet-reactive feature and a second ultraviolet-reactive feature, wherein a first opacity of the first ultraviolet-reactive feature is different from a second opacity of the second ultraviolet-reactive feature; or vi) any combination of i-v.

Example 48 is a system, comprising: one or more data processors; and a non-transitory computer-readable storage medium containing instructions which, when executed on the one or more data processors, cause the one or more data processors to perform operations including: accessing a digital card associated with a physical card, the physical card having i) one or more hidden features, wherein each of the one or more hidden features is visible when illuminated with ultraviolet light and undiscernible when illuminated with only visible light, and ii) one or more conspicuous features, wherein each of the one or more conspicuous features is visible when illuminated with only visible light; presenting, as the digital card, a representation of the physical card, wherein presenting the representation includes displaying the one or more conspicuous features without displaying the one or more hidden features; receiving an activation signal; and updating the representation of the physical card by displaying the one or more hidden features in response to receiving the activation signal.

Example 49 is the system of example(s) 48, wherein receiving the activation signal includes initiating a payment using the digital card.

Example 50 is the system of example(s) 49, wherein receiving the activation signal includes receiving confirmation of the payment.

Example 51 is the system of example(s) 48-50, wherein receiving the activation signal includes receiving a user input via an input device.

Example 52 is the system of example(s) 48-51, wherein receiving the activation signal includes receiving a transaction confirmation associated with a transaction performed by the physical card.

Example 53 is the system of example(s) 48-52, wherein receiving the activation signal includes detecting proximity of the physical card.

Example 54 is the system of example(s) 48, wherein the one or more hidden features includes: i) a graphical feature; ii) an emphasis feature associated with at least one of the one or more conspicuous features; iii) a textual message; iv) an upper ultraviolet-reactive feature incorporated into an upper ultraviolet layer of the physical card and a lower ultraviolet-reactive feature incorporated into a lower ultraviolet layer of the physical card, wherein the upper ultraviolet layer and lower ultraviolet layer are on a same face of the physical card; v) a first ultraviolet-reactive feature and a second ultraviolet-reactive feature, wherein a first opacity of the first ultraviolet-reactive feature is different from a second opacity of the second ultraviolet-reactive feature; or vi) any combination of i-v.

Example 55 is a computer-program product tangibly embodied in a non-transitory machine-readable storage medium, including instructions configured to cause a data processing apparatus to perform operations including: accessing a digital card associated with a physical card, the physical card having i) one or more hidden features, wherein each of the one or more hidden features is visible when illuminated with ultraviolet light and undiscernible when illuminated with only visible light, and ii) one or more conspicuous features, wherein each of the one or more conspicuous features is visible when illuminated with only visible light; presenting, as the digital card, a representation of the physical card, wherein presenting the representation includes displaying the one or more conspicuous features without displaying the one or more hidden features; receiving an activation signal; and updating the representation of the physical card by displaying the one or more hidden features in response to receiving the activation signal.

Example 56 is the computer-program product of example(s) 55, wherein receiving the activation signal includes initiating a payment using the digital card.

Example 57 is the computer-program product of example(s) 55 or 56, wherein receiving the activation signal includes receiving a user input via an input device.

Example 58 is the computer-program product of example(s) 55-57, wherein receiving the activation signal includes receiving a transaction confirmation associated with a transaction performed by the physical card.

Example 59 is the computer-program product of example(s) 55-58, wherein receiving the activation signal includes detecting proximity of the physical card.

Example 60 is the computer-program product of example(s) 55-59, wherein the one or more hidden features includes: i) a graphical feature; ii) an emphasis feature associated with at least one of the one or more conspicuous features; iii) a textual message; iv) an upper ultraviolet-reactive feature incorporated into an upper ultraviolet layer of the physical card and a lower ultraviolet-reactive feature incorporated into a lower ultraviolet layer of the physical card, wherein the upper ultraviolet layer and lower ultraviolet layer are on a same face of the physical card; v) a first ultraviolet-reactive feature and a second ultraviolet-reactive feature, wherein a first opacity of the first ultraviolet-reactive feature is different from a second opacity of the second ultraviolet-reactive feature; or vi) any combination of i-v.

What is claimed is:

1. A method, comprising:
   accessing a digital card associated with a physical card, the physical card having i) one or more hidden features, wherein each of the one or more hidden features is visible when illuminated with ultraviolet light and undiscernible when illuminated with only visible light, and ii) one or more conspicuous features, wherein each of the one or more conspicuous features is visible when illuminated with only visible light;
   presenting, as the digital card, a representation of the physical card, wherein presenting the representation includes displaying the one or more conspicuous features without displaying the one or more hidden features;
   receiving an activation signal; and
   updating the representation of the physical card by displaying the one or more hidden features in response to receiving the activation signal.

2. The method of claim 1, wherein receiving the activation signal includes initiating a payment using the digital card.

3. The method of claim 2, wherein receiving the activation signal includes receiving confirmation of the payment.

4. The method of claim 1, wherein receiving the activation signal includes receiving a user input via an input device.

5. The method of claim 1, wherein receiving the activation signal includes receiving a transaction confirmation associated with a transaction performed by the physical card.

6. The method of claim 1, wherein receiving the activation signal includes detecting proximity of the physical card.

7. The method of claim 1, wherein the one or more hidden features includes:
   i) a graphical feature;
   ii) an emphasis feature associated with at least one of the one or more conspicuous features;
   iii) a textual message;
   iv) an upper ultraviolet-reactive feature incorporated into an upper ultraviolet layer of the physical card and a lower ultraviolet-reactive feature incorporated into a lower ultraviolet layer of the physical card, wherein the upper ultraviolet layer and lower ultraviolet layer are on a same face of the physical card;

v) a first ultraviolet-reactive feature and a second ultraviolet-reactive feature, wherein a first opacity of the first ultraviolet-reactive feature is different from a second opacity of the second ultraviolet-reactive feature; or vi) any combination of i-v.

8. A system, comprising:
one or more data processors; and
a non-transitory computer-readable storage medium containing instructions which, when executed on the one or more data processors, cause the one or more data processors to perform operations including:
   accessing a digital card associated with a physical card, the physical card having i) one or more hidden features, wherein each of the one or more hidden features is visible when illuminated with ultraviolet light and undiscernible when illuminated with only visible light, and ii) one or more conspicuous features, wherein each of the one or more conspicuous features is visible when illuminated with only visible light;
   presenting, as the digital card, a representation of the physical card, wherein presenting the representation includes displaying the one or more conspicuous features without displaying the one or more hidden features;
   receiving an activation signal; and
   updating the representation of the physical card by displaying the one or more hidden features in response to receiving the activation signal.

9. The system of claim 8, wherein receiving the activation signal includes initiating a payment using the digital card.

10. The system of claim 9, wherein receiving the activation signal includes receiving confirmation of the payment.

11. The system of claim 8, wherein receiving the activation signal includes receiving a user input via an input device.

12. The system of claim 8, wherein receiving the activation signal includes receiving a transaction confirmation associated with a transaction performed by the physical card.

13. The system of claim 8, wherein receiving the activation signal includes detecting proximity of the physical card.

14. The system of claim 8, wherein the one or more hidden features includes:
   i) a graphical feature;
   ii) an emphasis feature associated with at least one of the one or more conspicuous features;
   iii) a textual message;
   iv) an upper ultraviolet-reactive feature incorporated into an upper ultraviolet layer of the physical card and a lower ultraviolet-reactive feature incorporated into a lower ultraviolet layer of the physical card, wherein the upper ultraviolet layer and lower ultraviolet layer are on a same face of the physical card;
   v) a first ultraviolet-reactive feature and a second ultraviolet-reactive feature, wherein a first opacity of the first ultraviolet-reactive feature is different from a second opacity of the second ultraviolet-reactive feature; or
   vi) any combination of i-v.

15. A computer-program product tangibly embodied in a non-transitory machine-readable storage medium, including instructions configured to cause a data processing apparatus to perform operations including:
   accessing a digital card associated with a physical card, the physical card having i) one or more hidden features, wherein each of the one or more hidden features is visible when illuminated with ultraviolet light and undiscernible when illuminated with only visible light, and ii) one or more conspicuous features, wherein each of the one or more conspicuous features is visible when illuminated with only visible light;
   presenting, as the digital card, a representation of the physical card, wherein presenting the representation includes displaying the one or more conspicuous features without displaying the one or more hidden features;
   receiving an activation signal; and
   updating the representation of the physical card by displaying the one or more hidden features in response to receiving the activation signal.

16. The computer-program product of claim 15, wherein receiving the activation signal includes initiating a payment using the digital card.

17. The computer-program product of claim 15, wherein receiving the activation signal includes receiving a user input via an input device.

18. The computer-program product of claim 15, wherein receiving the activation signal includes receiving a transaction confirmation associated with a transaction performed by the physical card.

19. The computer-program product of claim 15, wherein receiving the activation signal includes detecting proximity of the physical card.

20. The computer-program product of claim 15, wherein the one or more hidden features includes:
   i) a graphical feature;
   ii) an emphasis feature associated with at least one of the one or more conspicuous features;
   iii) a textual message;
   iv) an upper ultraviolet-reactive feature incorporated into an upper ultraviolet layer of the physical card and a lower ultraviolet-reactive feature incorporated into a lower ultraviolet layer of the physical card, wherein the upper ultraviolet layer and lower ultraviolet layer are on a same face of the physical card;
   v) a first ultraviolet-reactive feature and a second ultraviolet-reactive feature, wherein a first opacity of the first ultraviolet-reactive feature is different from a second opacity of the second ultraviolet-reactive feature; or
   vi) any combination of i-v.

* * * * *